United States Patent
Nagata et al.

(10) Patent No.: US 8,156,515 B2
(45) Date of Patent: Apr. 10, 2012

(54) OPTICAL RECORDING MEDIUM AND REPRODUCING DEVICE

(75) Inventors: Takayuki Nagata, Osaka (JP); Joji Anzai, Osaka (JP); Hideki Aikoh, Osaka (JP)

(73) Assignee: Panasonic Corporation, Osaka (JP)

( * ) Notice: Subject to any disclaimer, the term of this patent is extended or adjusted under 35 U.S.C. 154(b) by 613 days.

(21) Appl. No.: 12/375,648

(22) PCT Filed: Jul. 27, 2007

(86) PCT No.: PCT/JP2007/064767
§ 371 (c)(1), (2), (4) Date: Jan. 29, 2009

(87) PCT Pub. No.: WO2008/015974
PCT Pub. Date: Feb. 7, 2008

(65) Prior Publication Data
US 2009/0303864 A1    Dec. 10, 2009

(30) Foreign Application Priority Data
Aug. 1, 2006  (JP) ................................. 2006-209656

(51) Int. Cl.
*G11B 7/24* (2006.01)
(52) U.S. Cl. .................. 720/718; 369/283; 369/286
(58) Field of Classification Search .................. 369/283, 369/286; 720/718
See application file for complete search history.

(56) References Cited

U.S. PATENT DOCUMENTS
2004/0139459 A1* 7/2004 Mishima et al. .............. 720/718
2006/0028971 A1* 2/2006 Mishima et al. ............. 369/275.1
2006/0062133 A1   3/2006 Tsukagoshi et al.
2007/0058516 A1   3/2007 Watabe et al.

FOREIGN PATENT DOCUMENTS
| JP | 2001-155380 | 6/2001 |
| JP | 2004-213720 | 7/2004 |
| JP | 2005-285222 | 10/2005 |
| JP | 2006-73053  | 3/2006 |
| JP | 2007-80303  | 3/2007 |
| WO | 2007/108507 | 9/2007 |

OTHER PUBLICATIONS
International Search Report issued Oct. 30, 2007 in the International (PCT) Application No. PCT/JP2007/064767.

* cited by examiner

*Primary Examiner* — Hoai V Ho
*Assistant Examiner* — Jay Radke
(74) *Attorney, Agent, or Firm* — Wenderoth, Lind & Ponack, L.L.P.

(57) ABSTRACT

An optical recording medium is provided having a plurality of laminated recording layers, wherein the recording layers are formed such that a spacing between each pair of recording layers of all recording layer combinations selected from the plurality of recording layers is different from that of each other pair. Accordingly, a return of lights reflected by other layers to an optical head along the same optical path as reflected light from a readout layer during the reproduction can be avoided. Therefore, use of the optical recording medium, from which a good reproduction signal can be obtained, can suppress a deterioration of a servo signal and a reproduction signal of a reproducing device due to a variation of interference fringes on a light receiving element.

14 Claims, 25 Drawing Sheets

FIG.5

| L0~L1 | L1~L2 | L2~L3 | L3~L4 |
|---|---|---|---|
| a+2b | a | a+3b | a+b |
| L0~L2 | L1~L3 | L2~L4 | |
| 2a+2b | 2a+3b | 2a+4b | |
| L0~L3 | L1~L4 | | |
| 3a+5b | 3a+4b | | |
| L0~L4 | | | |
| 4a+6b | | | |

FIG.6

| L0~L1 | L1~L2 | L2~L3 | L3~L4 |
|---|---|---|---|
| a | a+b | a+2b | a+3b |
| L0~L2 | L1~L3 | L2~L4 | |
| 2a+b | 2a+3b | 2a+5b | |
| L0~L3 | L1~L4 | | |
| 3a+3b | 3a+6b | | |
| L0~L4 | | | |
| 4a+6b | | | |

FIG.7

| L0~L1 | L1~L2 | L2~L3 | L3~L4 |
|---|---|---|---|
| a+b | a+3b | a+2b | a |
| L0~L2 | L1~L3 | L2~L4 | |
| 2a+4b | 2a+5b | 2a+2b | |
| L0~L3 | L1~L4 | | |
| 3a+6b | 3a+5b | | |
| L0~L4 | | | |
| 4a+6b | | | |

FIG.9

| L0~L1 | L1~L2 | L2~L3 | L3~L4 | L4~L5 |
|---|---|---|---|---|
| a+2b | a | a+3b | a+b | a+4b |
| L0~L2 | L1~L3 | L2~L4 | L3~L5 | |
| 2a+2b | 2a+3b | 2a+4b | 2a+5b | |
| L0~L3 | L1~L4 | L2~L5 | | |
| 3a+5b | 3a+4b | 3a+8b | | |
| L0~L4 | L1~L5 | | | |
| 4a+6b | 4a+8b | | | |
| L0~L5 | | | | |
| 4a+10b | | | | |

FIG.10

| L0~L1 | L1~L2 | L2~L3 | L3~L4 | L4~L5 |
|---|---|---|---|---|
| a | a+b | a+2b | a+3b | a+4b |
| L0~L2 | L1~L3 | L2~L4 | L3~L5 | |
| 2a+b | 2a+3b | 2a+5b | 2a+7b | |
| L0~L3 | L1~L4 | L2~L5 | | |
| 3a+3b | 3a+6b | 3a+9b | | |
| L0~L4 | L1~L5 | | | |
| 4a+6b | 4a+10b | | | |
| L0~L5 | | | | |
| 5a+10b | | | | |

FIG.11

| L0~L1 | L1~L2 | L2~L3 | L3~L4 | L4~L5 |
|-------|-------|-------|-------|-------|
| a+3b  | a+b   | a+4b  | a+2b  | a     |
| L0~L2 | L1~L3 | L2~L4 | L3~L5 | |
| 2a+4b | 2a+5b | 2a+6b | 2a+2b | |
| L0~L3 | L1~L4 | L2~L5 | | |
| 3a+8b | 3a+7b | 3a+6b | | |
| L0~L4 | L1~L5 | | | |
| 4a+10b | 4a+7b | | | |
| L0~L5 | | | | |
| 5a+10b | | | | |

FIG.13

| L0~L1 | L1~L2 | L2~L3 | L3~L4 | L4~L5 | L5~L6 |
|---|---|---|---|---|---|
| a+3b | a | a+4b | a+b | a+5b | a+2b |
| L0~L2 | L1~L3 | L2~L4 | L3~L5 | L4~L6 | |
| 2a+3b | 2a+4b | 2a+5b | 2a+6b | 2a+7b | |
| L0~L3 | L1~L4 | L2~L5 | L3~L6 | | |
| 3a+7b | 3a+5b | 3a+10b | 3a+8b | | |
| L0~L4 | L1~L5 | L2~L5 | | | |
| 4a+8b | 4a+10b | 4a+12b | | | |
| L0~L5 | L1~L6 | | | | |
| 5a+13b | 5a+12b | | | | |
| L0~L6 | | | | | |
| 6a+15b | | | | | |

FIG.14

| L0~L1 | L1~L2 | L2~L3 | L3~L4 | L4~L5 | L5~L6 |
|---|---|---|---|---|---|
| a | a+b | a+2b | a+3b | a+4b | a+5b |
| L0~L2 | L1~L3 | L2~L4 | L3~L5 | L4~L6 | |
| 2a+b | 2a+3b | 2a+5b | 2a+7b | 2a+9b | |
| L0~L3 | L1~L4 | L2~L5 | L3~L6 | | |
| 3a+3b | 3a+6b | 3a+9b | 3a+12b | | |
| L0~L4 | L1~L5 | L2~L5 | | | |
| 4a+6b | 4a+10b | 4a+14b | | | |
| L0~L5 | L1~L6 | | | | |
| 5a+10b | 5a+15b | | | | |
| L0~L6 | | | | | |
| 6a+15b | | | | | |

FIG.15

| L0~L1 | L1~L2 | L2~L3 | L3~L4 | L4~L5 | L5~L6 |
|---|---|---|---|---|---|
| a+b | a+4b | a+2b | a+5b | a+3b | a |
| L0~L2 | L1~L3 | L2~L4 | L3~L5 | L4~L6 | |
| 2a+5b | 2a+6b | 2a+7b | 2a+8b | 2a+3b | |
| L0~L3 | L1~L4 | L2~L5 | L3~L6 | | |
| 3a+7b | 3a+11b | 3a+10b | 3a+8b | | |
| L0~L4 | L1~L5 | L2~L5 | | | |
| 4a+12b | 4a+14b | 4a+10b | | | |
| L0~L5 | L1~L6 | | | | |
| 5a+15b | 5a+14b | | | | |
| L0~L6 | | | | | |
| 6a+15b | | | | | |

FIG.17

| L0~L1 | L1~L2 | L2~L3 | L3~L4 | L4~L5 | L5~L6 | L6~L7 |
|---|---|---|---|---|---|---|
| a+3b | a | a+4b | a+b | a+5b | a+2b | a+6b |
| L0~L2 | L1~L3 | L2~L4 | L3~L5 | L4~L6 | L5~L7 | |
| 2a+3b | 2a+4b | 2a+5b | 2a+6b | 2a+7b | 2a+8b | |
| L0~L3 | L1~L4 | L2~L5 | L3~L6 | L4~L7 | | |
| 3a+7b | 3a+5b | 3a+10b | 3a+8b | 3a+13b | | |
| L0~L4 | L1~L5 | L2~L5 | L3~L7 | | | |
| 4a+8b | 4a+10b | 4a+12b | 4a+14b | | | |
| L0~L5 | L1~L6 | L2~L7 | | | | |
| 5a+13b | 5a+12b | 5a+18b | | | | |
| L0~L6 | L1~L7 | | | | | |
| 6a+15b | 6a+18b | | | | | |
| L0~L7 | | | | | | |
| 7a+21b | | | | | | |

FIG.18

| L0~L1 | L1~L2 | L2~L3 | L3~L4 | L4~L5 | L5~L6 | L6~L7 |
|---|---|---|---|---|---|---|
| a | a+b | a+2b | a+3b | a+4b | a+5b | a+6b |
| L0~L2 | L1~L3 | L2~L4 | L3~L5 | L4~L6 | L5~L7 | |
| 2a+b | 2a+3b | 2a+5b | 2a+7b | 2a+9b | 2a+8b | |
| L0~L3 | L1~L4 | L2~L5 | L3~L6 | L4~L7 | | |
| 3a+3b | 3a+6b | 3a+9b | 3a+12b | 3a+13b | | |
| L0~L4 | L1~L5 | L2~L5 | L3~L7 | | | |
| 4a+6b | 4a+10b | 4a+14b | 4a+14b | | | |
| L0~L5 | L1~L6 | L2~L7 | | | | |
| 5a+10b | 5a+15b | 5a+18b | | | | |
| L0~L6 | L1~L7 | | | | | |
| 6a+15b | 6a+18b | | | | | |
| L0~L7 | | | | | | |
| 7a+21b | | | | | | |

FIG.19

| L0~L1 | L1~L2 | L2~L3 | L3~L4 | L4~L5 | L5~L6 | L6~L7 |
|---|---|---|---|---|---|---|
| a+4b | a+b | a+5b | a+2b | a+6b | a+3b | a |
| L0~L2 | L1~L3 | L2~L4 | L3~L5 | L4~L6 | L5~L7 | |
| 2a+5b | 2a+6b | 2a+7b | 2a+8b | 2a+9b | 2a+3b | |
| L0~L3 | L1~L4 | L2~L5 | L3~L6 | L4~L7 | | |
| 3a+10b | 3a+8b | 3a+13b | 3a+11b | 3a+9b | | |
| L0~L4 | L1~L5 | L2~L5 | L3~L7 | | | |
| 4a+12b | 4a+14b | 4a+16b | 4a+11b | | | |
| L0~L5 | L1~L6 | L2~L7 | | | | |
| 5a+18b | 5a+17b | 5a+16b | | | | |
| L0~L6 | L1~L7 | | | | | |
| 6a+21b | 6a+17b | | | | | |
| L0~L7 | | | | | | |
| 7a+21b | | | | | | |

FIG.21

| L0～L1 | L1～L2 | L2～L3 | L3～Sf |
|--------|--------|--------|--------|
| a+2b   | a      | a+3b   | a+b    |
| L0～L2 | L1～L3 | L2～Sf | |
| 2a+2b  | 2a+3b  | 2a+4b  | |
| L0～L3 | L1～Sf | | |
| 3a+5b  | 3a+4b  | | |
| L0～Sf | | | |
| 4a+6b  | | | |

FIG.22

| L0~L1 | L1~L2 | L2~L3 | L3~Sf |
|---|---|---|---|
| a | a+b | a+2b | a+3b |■

| L0~L2 | L1~L3 | L2~Sf |
|---|---|---|
| 2a+b | 2a+3b | 2a+5b |

| L0~L3 | L1~Sf |
|---|---|
| 3a+3b | 3a+6b |

| L0~Sf |
|---|
| 4a+6b |

FIG.23

| L0~L1 | L1~L2 | L2~L3 | L3~Sf |
|---|---|---|---|
| a+b | a+3b | a+2b | a |
| L0~L2 | L1~L3 | L2~Sf | |
| 2a+4b | 2a+5b | 2a+2b | |
| L0~L3 | L1~Sf | | |
| 3a+6b | 3a+5b | | |
| L0~Sf | | | |
| 4a+6b | | | |

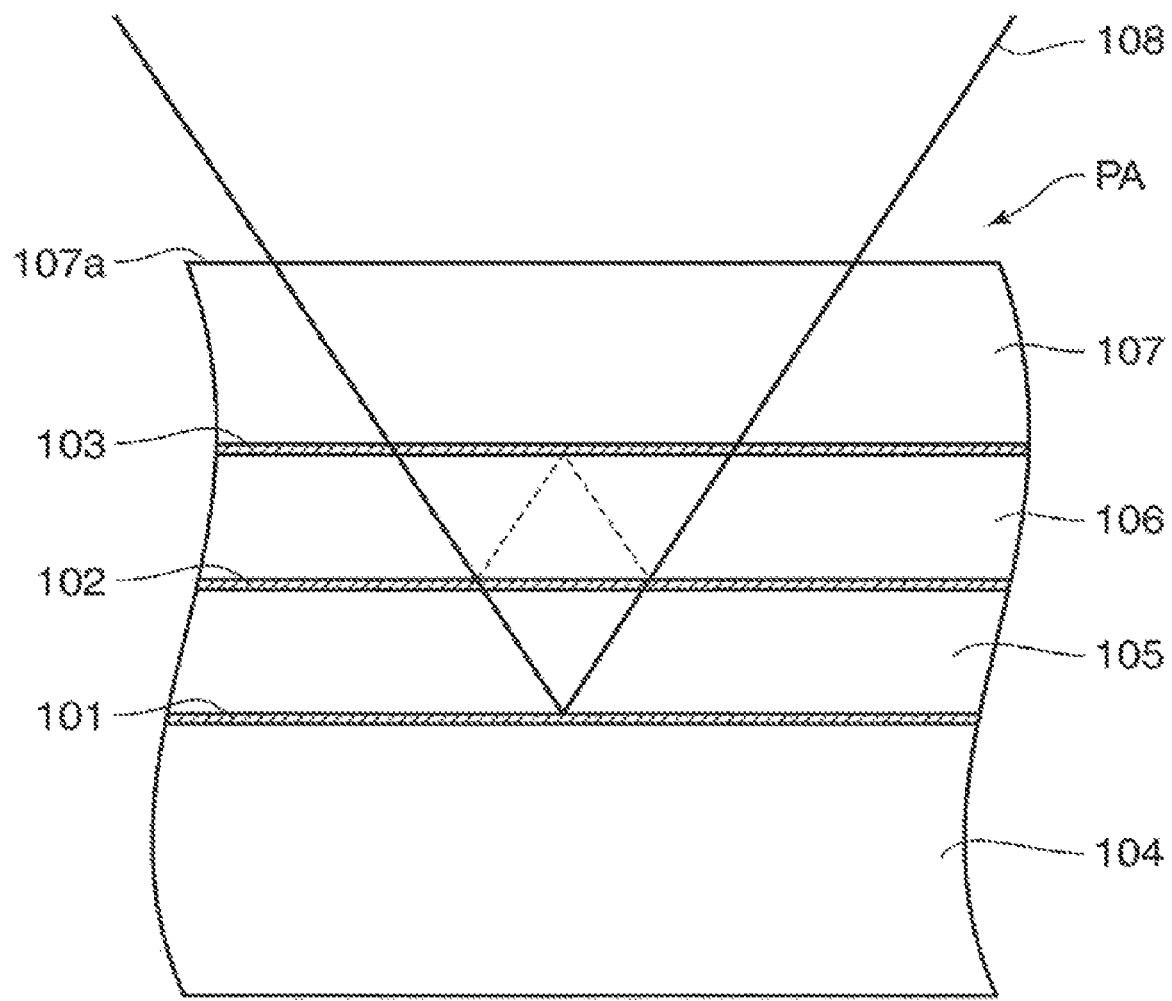

OPTICAL RECORDING MEDIUM AND REPRODUCING DEVICE

BACKGROUND OF THE INVENTION

1. Field of Invention

The present invention relates to an optical recording medium with a multitude of information recording layers and particularly relates to an interlayer spacing structure of a multilayer optical disc provided with five or more information recording layers or a cover layer and four or more information recording layers.

2. Description of the Related Art

In recent years, the use of optical discs in audio field, video field, computer field and many other fields has been promoted since a large quantity of information signals can be recorded at a high density. Recording capacity required for such optical discs increases year after year and various methods have been and are being proposed to accomplish this. A method for forming an information recording layer (hereinafter, "recording layer") of an optical disc into a double layer structure has been proposed as one of them and already put to practical use.

Such optical discs are structured to laminate recording layers via a transparent intermediate layer, and optical discs with three or more recording layers have also been proposed. However, multilayer optical discs have a problem that reflected light from a desired recording layer (hereinafter, "readout layer") having information reproduced therefrom is mixed with reflected lights from recording layers (hereinafter, "other layers") other than the readout layer, and some of the reflected lights from the other layers have large influence due to the spacings between the respective recording layers.

FIGS. 24 and 25 are diagrams showing this problem, wherein FIG. 24 is a perspective view partly cut away showing the external appearance of an optical disc and FIG. 25 is an enlarged partial section showing a part PA shown in FIG. 24.

In FIGS. 24 and 25, the optical disc having a plurality of recording layers is identified as reference element 100, recording layers are identified as reference elements 101-103, a supporting substrate is identified as reference element 104, intermediate layers having an equal thickness are identified as reference elements 105 and 106, a cover layer is identified as reference element 107, a light incident surface is identified as reference element 107a, and light irradiated from an optical head is identified as reference element 108.

A case of reproducing a signal on the recording layer 101 from the optical disc 100 structured as above is thought. At this time, the light 108 irradiated from the optical head is focused on the recording layer 101, but a part of the light reflected by the recording layer 102 is also focused on the recording layer 103 if the thickness of the intermediate layer 105 and that of the intermediate layer 106 are equal. A part of the light focused on this recording layer 103 is reflected by the recording layer 103 and reflected again by the recording layer 102 and returns to the optical head substantially along the same optical path as the light reflected by the recording layer 101. Thus, a problem of mixing a signal of the recording layer 103 with a reproduction signal occurs. Hereinafter, this is called a "back focus problem" in this specification.

Spacings between recording layers of an optical disc in consideration of such a back focus problem are proposed in patent Literature 1. In this literature, an occurrence of the above problem is prevented by constructing the optical disc such that spacings from an arbitrary recording layer to all the recording layers at a side toward a supporting substrate and spacings from this recording layer to all the recording layers at a side toward a cover layer do not equal each other. As an embodiment of this, a structure for making the thicknesses of the intermediate layers successively larger or successively smaller from the supporting substrate side toward the cover layer side has been proposed.

However, what is considered in the disc structure disclosed in patent literature 1 is only that light irradiated from the optical head is focused on the other layer during the reproduction and this focused light is mixed with the reproduction light to increase interlayer crosstalk, but the interference of the reflected light from the readout layer and reflected lights from the other layers is not considered.

For example, in the disc structure as shown in FIG. 25, a part of the reflected light from the other layer returns to the optical head substantially with the same wave front along the same optical path as the reflected light from the readout layer. Such light has high coherency and forms a light-dark distribution on a light receiving element due to interference. Further, this light-dark distribution varies according to a phase difference change from the reflected light from the other layer caused by the thickness variation of the intermediate layers in the optical disc. This becomes a serious problem of drastically reducing the qualities of a servo signal and a reproduction signal.

Patent Literature 1:
Japanese Unexamined Patent Publication No. 2001-155380

BRIEF SUMMARY OF THE INVENTION

An object of the present invention is to provide an optical recording medium capable of reducing the influence of interference on a servo signal and a reproduction signal in an optical head by preventing reflected lights from other layers from returning to the optical head along the same optical path as reflected light from a readout layer.

One aspect of the present invention is directed to an optical recording medium comprising a plurality of recording layers, wherein all the spacings between two recording layers in all the combinations selected from the plurality of recording layers do not equal each other.

According to the above construction, the return of lights reflected by other layers to an optical head along the same optical path as reflected light from a readout layer during the reproduction can be avoided. Thus, an optical recording medium, from which a good reproduction signal can be obtained, can be provided by suppressing the deterioration of a servo signal and a reproduction signal of a reproducing device due to a variation of interference fringes on a light receiving element.

BRIEF DESCRIPTION OF THE DRAWINGS

FIG. 5 is a diagram showing a design example of spacings between recording layers of the optical disc shown in FIG. 3, FIG. 6 is a diagram showing a design example of spacings between recording layers of an optical disc as a comparative example, FIG. 7 is a diagram showing another design example in the first embodiment of the invention, FIG. 9 is a diagram showing a design example of spacings between recording layers of the optical disc shown in FIG. 8, FIG. 10 is a diagram showing a design example of spacings between recording layers of an optical disc as a comparative example, FIG. 11 is a diagram showing another design example in the second embodiment of the invention, FIG. 13 is a diagram showing a design example of spacings between recording layers of the optical disc shown in FIG. 12, FIG. 14 is a diagram showing a design example of spacings between recording layers of an optical disc as a comparative example, FIG. 15 is a diagram showing another design example in the third embodiment of the invention, FIG. 17 is a diagram showing a design example of spacings between recording layers of the optical disc shown in FIG. 16, FIG. 18 is a diagram showing a design example of spacings between recording layers of an optical disc as a comparative example, FIG. 19 is a diagram showing another design example in the fourth embodiment of the invention, FIG. 21 is a diagram showing a design example of spacings between recording layers and spacings between the recording layers and a light incident surface of a cover layer in the optical disc shown in FIG. 20, FIG. 22 is a diagram showing an example of the thicknesses of a cover layer and intermediate layers as a comparative example, FIG. 23 is a diagram showing another design example in the fifth embodiment of the invention, FIG. 25 is a partial section of the optical disc shown in FIG. 24.

DETAILED DESCRIPTION OF THE INVENTION

In order to solve the above conventional problems, the inventors of the present application keenly examined the interference of reflected light from a readout layer of an optical recording medium with many information recording layers and reflected lights from other layers and found out that an interference problem occurred not only in disc structures that cause the back focus problem considered in patent literature 1, but also when the number of recording layers increases because interference by lights reflected from other layers without being focused on the other layers have a large influence. In this way, the present invention was completed. In other words, the present invention is based on knowledge described below.

Figure 1:
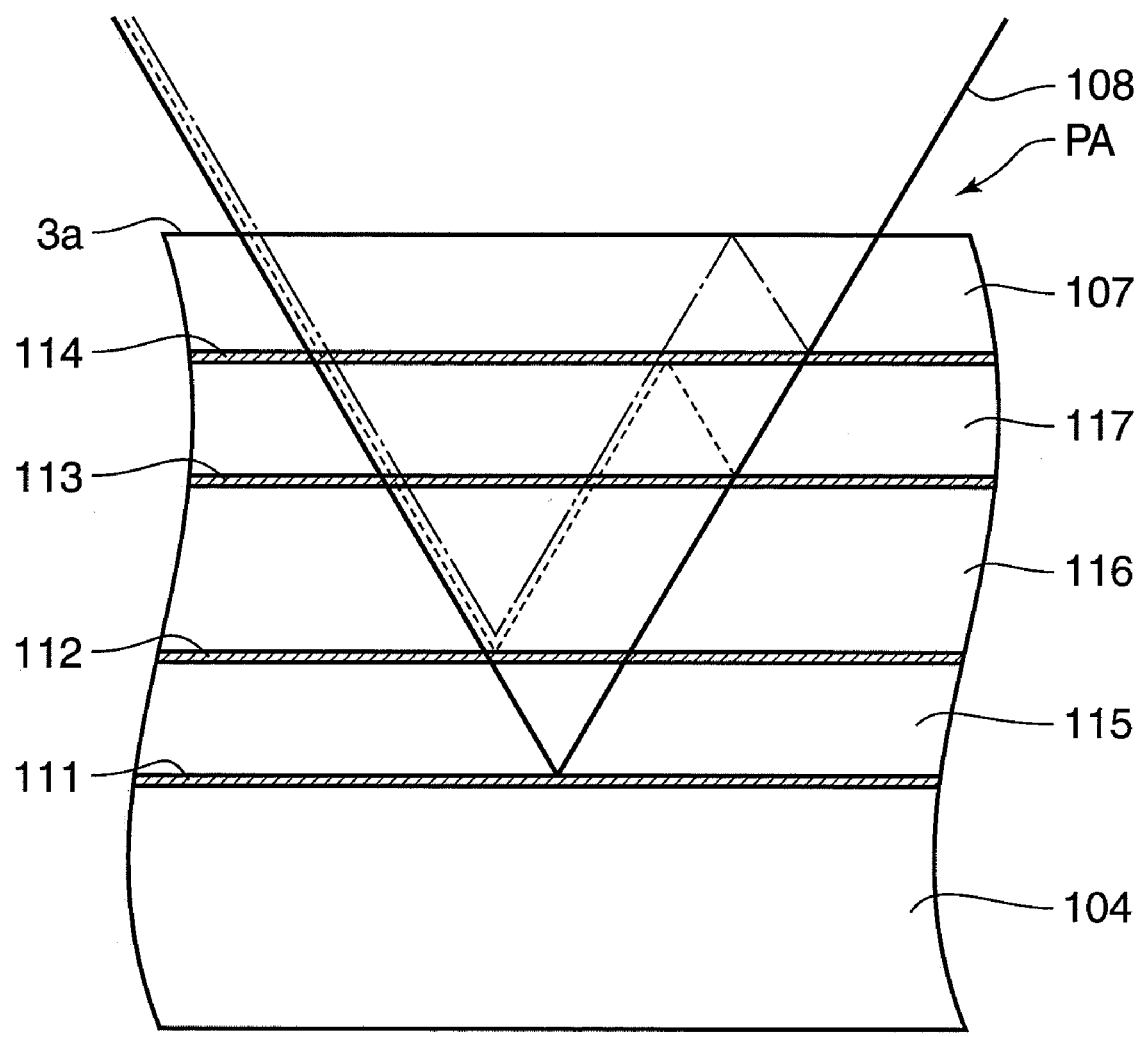
FIG. 1 is a diagram showing a problem of a disc structure.

FIG. 1 is a section of a four-layer disc having a disc structure set such that the back focus problem considered in patent literature 1 does not occur. In FIG. 1, recording layers are identified as reference elements 111-114, and intermediate layers are identified as reference elements 115-117. The same constituent elements as those in FIG. 25 are identified by the same reference numerals and not described. Here, the thicknesses of the intermediate layers 115 and 117 are equal and that of the intermediate layer 116 is larger than those of the other intermediate layers. Since the thicknesses of the adjacent intermediate layers differ, the back focus problem does not occur.

In this disc structure, in the case of reproducing a signal from the recording layer 111, light 108 irradiated from an optical disc is focused on the recording layer 111. However, if the thickness of the intermediate layer 115 is equal to that of the intermediate layer 117, light (broken line) reflected by the recording layers 113, 114 and 112 in this order and light (not shown) reflected by the recording layers 112, 114 and 113 in this order return to the optical head along the same optical path as light reflected by the recording layer 111. The light of the optical path shown by broken line is not focused on the other layers, but returns to the optical head along the same optical path as the reproduction light, therefore an interference problem is caused.

The disc structure that causes this interference problem is thought in a generalized manner. For example, if a case where a plurality of recording layers are located between the recording layers 111 and 112 or between the recording layers 113 and 114 shown in FIG. 1 is thought, an interference problem is understood to similarly occurs also in this case if a spacing between the recording layers 111 and 112 and the one between the recording layers 113 and 114 are equal.

In the case of a four-layer disc, the influence of the reflection of not only the recording layers, but also a light incident surface 3a as a surface of a cover layer 107 at a light incident side is comparable to the above and an interference problem similarly occurs. For example, in the case of reproducing a signal from the recording layer 111, light 108 irradiated from the optical disc is focused on the recording layer 111. However, if the thickness of the cover layer 107 is equal to that of the intermediate layer 115, light (dashed-dotted line) reflected by the recording layers 114, the light incident surface 3a of the cover layer 107 and the recording layer 112 in this order returns to the optical head along the same optical path as light reflected by the recording layer 111. The light of the optical path shown by dashed-dotted line is not also focused on the other layers, but returns to the optical head along the same optical path as the reproduction light, therefore an interference problem is caused.

If the above phenomenon is generalized, it can be said to be a condition to cause the above interference problem that a spacing between two arbitrary recording layers (including the case where one of the recording layer is the light incident surface of the cover layer) and a spacing between other two arbitrary recording layers (including the case where one of the recording layer is the light incident surface of the cover layer) are equal. In this specification, a spacing between two recording layers (including the case where one of the recording layers is the light incident surface of the cover layer) is called an interlayer spacing and a difference between one interlayer spacing and another interlayer spacing is called an interlayer spacing difference.

Accordingly, the interlayer spacing of two adjacent recording layers is the thickness of the intermediate layer arranged between these two recording layers and the interlayer spacing of two recording layers (including the case where one of the recording layer is the light incident surface of the cover layer) sandwiching one or more recording layers is treated as being equal to the sum of the thicknesses of all the intermediate layers (including the cover layer) arranged between these two recording layers since the thickness of the recording layers is much thinner than that of the intermediate layers. Since fine convexo-concave configurations are actually present on the outer surfaces of the intermediate layers and the cover layer, the thicknesses of the intermediate layers and the cover layer are assumed to mean average in-plane thicknesses.

Technically speaking, the above interference problem occurs when a certain interlayer spacing is substantially equal to another interlayer spacing. If the interlayer spacing difference is increased, the wave front of reflected light from the readout layer deviates from those of reflected lights from other layers on a light receiving element. Thus, interference fringes become gradually finer and, even if the interference fringes vary, they are averaged to decrease the influence on a signal.

Figure 2:
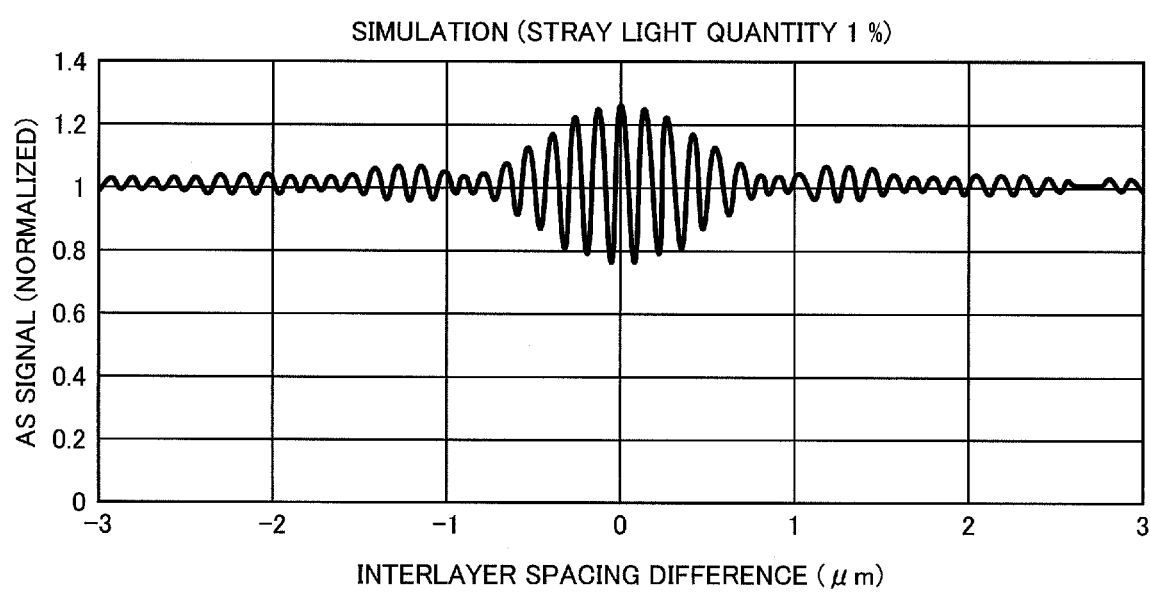
FIG. 2 is a graph showing a simulation result indicating a light quantity variation caused by interlayer spacing differences and interference.

The influence of the interlayer spacing difference and the interference influence were simulated on conditions that the refractive index of an optical disc was 1.6 and light wavelength was 405 nm and it was confirmed that a light quantity variation notably appeared when the interlayer spacing difference was 1 μm or smaller as shown in FIG. 2. In other words, on the above conditions, the interference problem can be avoided if the interlayer spacing differences of all the combinations in the optical disc are 1 μm or larger.

However, in an actual optical disc, thickness errors and variations of intermediate layers need to be considered. For example, if the thickness errors of the intermediate layers are ±2 μm, the disc structure may be determined such that design values of the respective interlayer spacing differences are 5 μm or larger to ensure interlayer spacing differences of 1 μm or larger even in a worst case scenario.

Such a disc structure can be easily formed by increasing the thicknesses of the respective intermediate layers, but it is not possible to unlimitedly thicken the intermediate layers in order to ensure compatibility with optical discs presently put to practical use. The disc structure needs to be elaborated to make differences among all the interlayer spacings equal to or larger than a specified value while suppressing the thicknesses of the intermediate layers.

An example is described below. In a four-layer disc, it is assumed that recording layers are successively L0, L1, L2 and L3 and the thicknesses of intermediate layers are successively T1, T2 and T3 in this order from a supporting substrate side and T1<T2<T3 is established as proposed in patent literature 1. There is though such a disc structure that all the interlayer spacing differences are 5 μm or larger in this disc.

Interlayer spacings considered here are six interlayer spacings between the layers L0 and L1, between the layers L1 and L2, between the layers L2 and L3, between the layers L0 and L2, between the layers L1 and L3 and between the layers L0 and L3. At this time, if the thicknesses of the intermediate layers are set such that T1 is 5 μm, T2 is 10 μm and T3 is 15 μm, the spacing between the layers L0 and L2 and the one between the layers L2 and L3 are equal. In order to avoid this, the intermediate layers need to be thickened, for example, by setting T1, T2 and T3 to 5 μm, 10 μm and 20 μm.

On the other hand, if the order of the thicknesses of the intermediate layers are changed such that T1 is 5 μm, T2 is 15 μm and T3 is 10 μm, all the interlayer spacing differences can be 5 μm or larger while the interlayer spacing between the layers L0 and L3 is kept as it is. In the case of such a structure in which the minimum interlayer spacing difference is equal to or above a specified value, the intermediate layers become thicker unless the order of the thicknesses of the intermediate layers is elaborated.

Thus, another object of the present invention in addition to the above object is to provide an optical recording medium which prevents intermediate layers from being thickened more than necessary and easily acquires compatibility with optical discs presently put to practical use.

Embodiments of the present invention developed based on the above knowledge are described below with reference to the drawings.

First Embodiment

Figure 3:
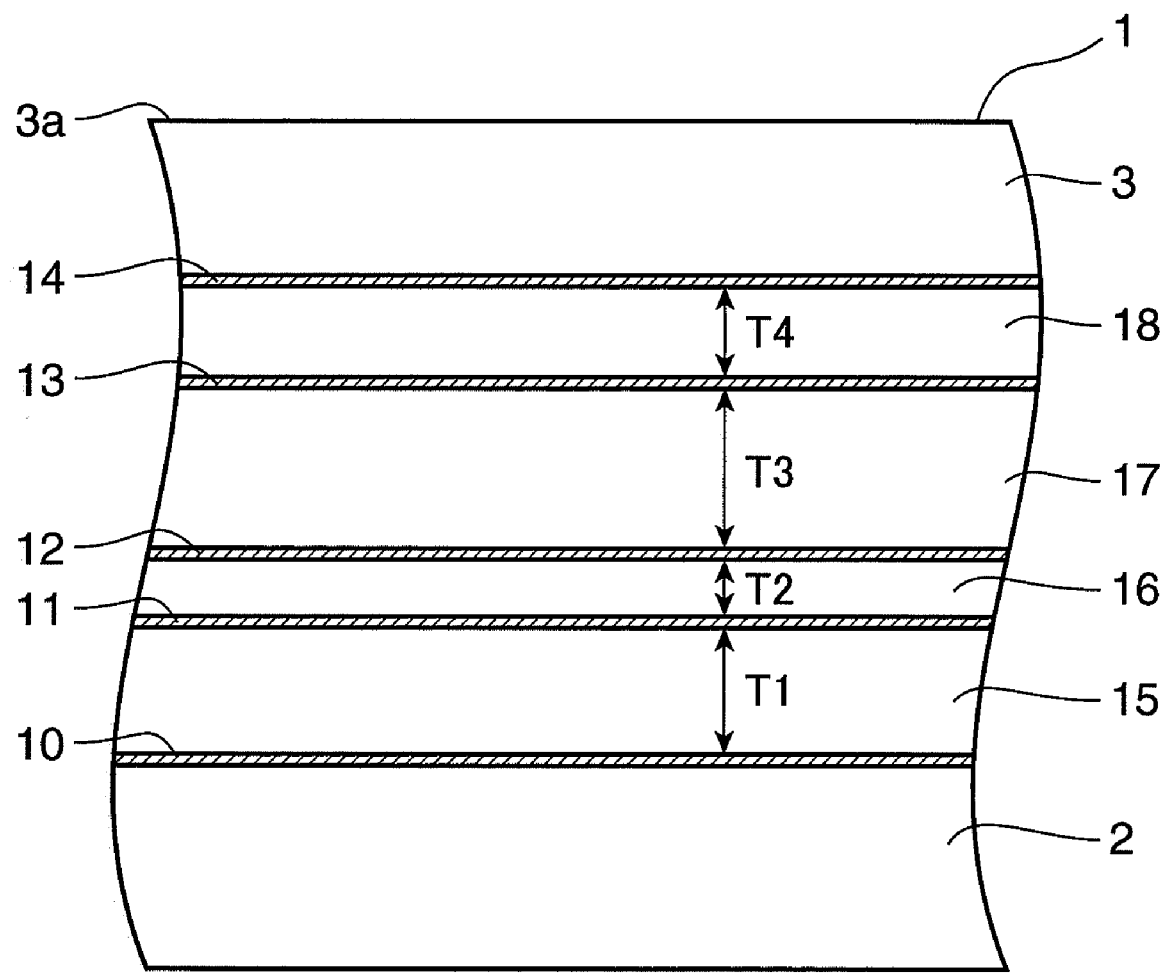
FIG. 3 is a partial section of an optical disc according to a first embodiment of the invention.

FIG. 3 is a partial section of an optical disc according to a first embodiment of the present invention. In FIG. 3, an optical disc with a plurality of recording layers is identified as reference element 1, a supporting substrate, which ensures a thickness (of about 1.2 mm) required for the optical disc 1, is identified as reference element 2, a cover layer having high light transmittance is identified as reference element 3, and a light incident surface of the cover layer 3 is identified as reference element 3a.

Information recording layers (hereinafter, "recording layers") for storing data are identified as reference elements 10-14, some or all of the respective recording layers are recording layers exclusively used for reproduction or recordable or rewritable recording layers in which information can be written by a user. Hereinafter, the recording layer 10 is called a layer L0, the recording layer 11 a layer L1, the recording layer 12 a layer L2, the recording layer 13 a layer L3 and the recording layer 14 a layer L4. Intermediate layers, which have a high light transmittance and function to physically and optically separate the respective recording layers, are identified as reference elements 15-18.

In the optical disc 1 according to this embodiment, if T1, T2, T3 and T4 respectively denote the thicknesses of the intermediate layers 15, 16, 17 and 18, then the thicknesses of the respective intermediate layers 15 to 18 are set to satisfy equations (1) to (4).

$$T1 = a + 2b \tag{1}$$

$$T2 = a \tag{2}$$

$$T3 = a + 3b \tag{3}$$

$$T4 = a + b \tag{4}$$

Here, "a" is a minimum interlayer spacing and "b" is a minimum interlayer spacing difference, both being set to satisfy $a \geq 2b$. The value of the minimum interlayer spacing difference "b" is set to be larger than thickness errors of the respective intermediate layers 15 to 18.

Figure 4:
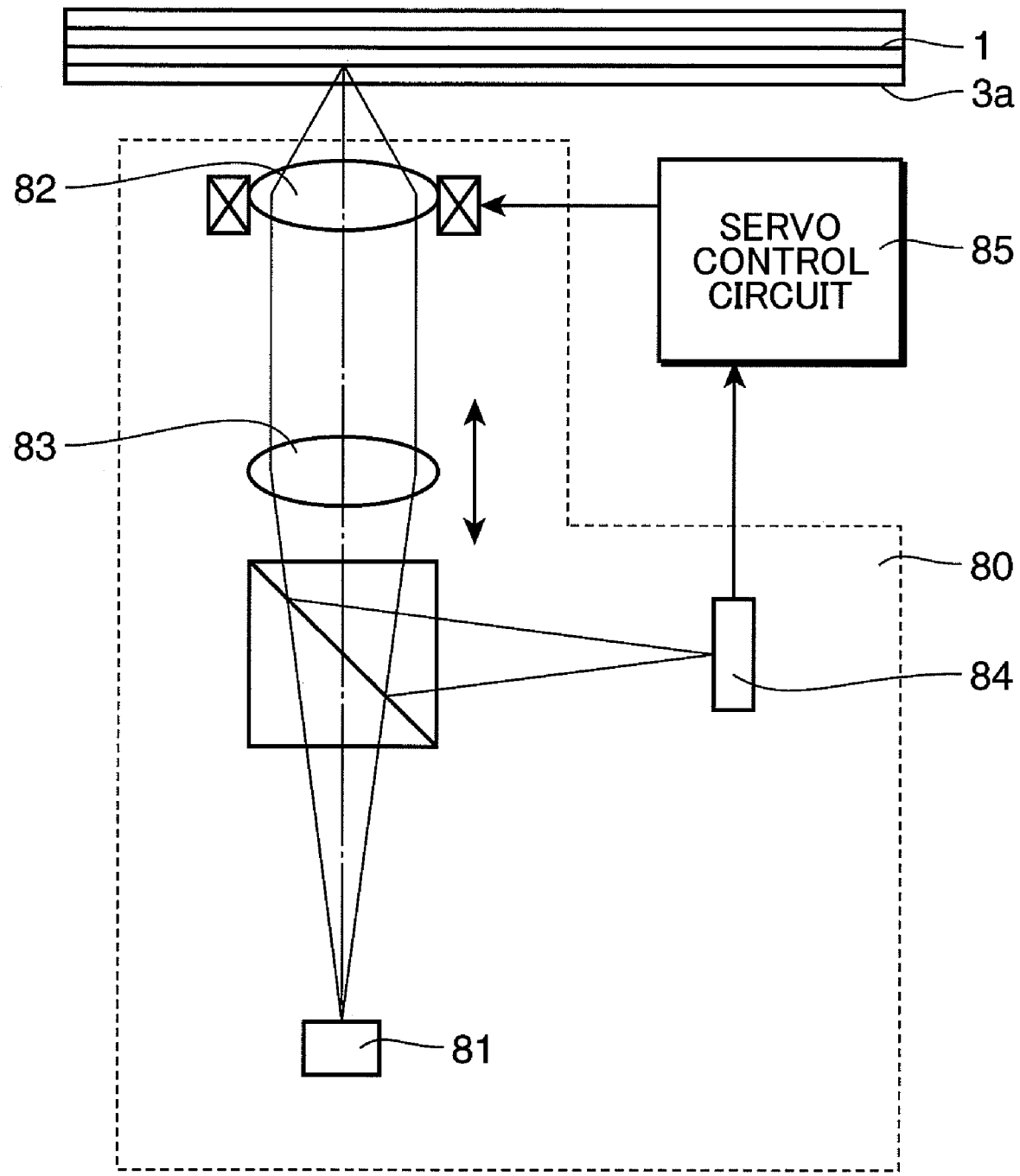
FIG. 4 is a construction diagram of a recording/reproducing device for recording or reproducing information on or from the optical disc shown in FIG. 3.

FIG. 4 is a construction diagram of a recording/reproducing device for recording or reproducing information on or from the optical disc 1 shown in FIG. 3. In FIG. 4, an optical head is identified as reference element 80, a semiconductor laser as a light source is identified as reference element 81, an objective lens for focusing light from the semiconductor laser on a desired recording layer of the optical disc is identified as reference element 82, a collimator lens as a spherical aberration correcting member, which corrects a spherical aberrations produced due to differences in thicknesses from the outer surface of the optical disc to the respective recording layers, is identified as reference element 83, a light receiving element for detecting a signal by receiving reflected light from the optical disc is identified as reference element 84, and a servo control circuit, which generates a tracking error signal and a focus error signal for feedback based on the signal obtained in the light receiving element and controls the position of the objective lens 82, is identified as reference element 85. The servo control circuit 85 corrects the spherical aberrations in the respective layers by moving the collimator lens 83 in arrow directions and realizes the recording on or reproduction from the respective layers by performing a focus drive and a tracking drive to the objective lens 82.

In the case of reproducing data from the optical disc 1 using the recording/reproducing device having the above construction, a laser beam emitted from the optical head 80 is incident on the light incident surface 3*a* of the optical disc 1 and is focused on a desired recording layer out of the layers L0 to L4. The light reflected by this recording layer returns to the optical head 80 again to have a signal detected by the light receiving element 84. At this time, parts of lights reflected by the recording layers other than the recording layer, from which data is reproduced, also return to the optical head. Although the recording/reproducing device is described above as an example, a reproducing device for only reproduction can operate similar to the above, the present invention can be similarly applied thereto and similar effects can be obtained. Therefore, the reproducing device may be either a device exclusively used for reproduction or a device for recording and reproduction.

However, in the optical disc 1 according to this embodiment, lights reflected by the other layers do not return to the optical head along the same optical path as the reflected light from the readout layer regardless of on which recording layer out of the layers L0 to L4 a laser beam is focused. This is described below.

A condition to prevent reflected light from the readout layer and those from the other layers from returning to the optical head along the same optical path in the optical disc 1 is that all the interlayer spacings are not equal.

If all the interlayer spacings in the optical disc 1 are expressed using the thicknesses T1 to T4 of the intermediate layers 15 to 18, there are ten interlayer spacings, i.e. T1, T2, T3, T4, T1+T2, T2+T3, T3+T4, T1+T2+T3, T2+T3+T4, T1+T2+T3+T4. At this time, the respective interlayer spacings are as shown in FIG. 5 and the following inequality expressions hold if a magnitude relation is considered. In FIG. 5, a+2b corresponding to L0 to L1 means an interlayer spacing between the layers L0 (recording layer 10) and L1 (recording layer 11), i.e. the thickness T1 of the intermediate layer 15. This similarly holds for other cells.

$$T2<T4<T1<T3 \quad (5)$$

$$T1+T2<T2+T3<T3+T4 \quad (6)$$

$$T2+T3+T4<T1+T2+T3<T1+T2+T3+T4 \quad (7)$$

Here, since a≧2b in this embodiment, the following inequality expression holds between the thickness T3 of the thickest intermediate layer 17 and the minimum one T1+T2 of the sums of the thicknesses of two adjacent intermediate layers and a difference between T3 and T1+T2 is larger than the minimum interlayer spacing difference "b".

$$T3<T1+T2 \quad (8)$$

Accordingly, inequality expressions hold between all the interlayer spacings from the expressions (5) to (8). Here, since the value of the minimum interlayer spacing difference "b" is set to be larger than the thickness errors of the intermediate layers 15 to 18, these inequality expressions constantly hold.

As described above, since all the interlayer spacings are not equal in the optical disc of this embodiment, the return of lights reflected by the other layers to the optical head along the same optical path as reflected light from the readout layer during the reproduction can be avoided.

Next, a case where it is designed to make the intermediate layers 15 to 18 successively thicker from the supporting substrate 2 toward the cover layer 3 is thought as a comparative example. At this time, if the order of the thicknesses in the structure shown in FIG. 5 is replaced to suppress the thicknesses of the intermediate layers, the respective interlayer spacings are as shown in FIG. 6.

Here, if all the interlayer spacing differences are equal to or larger than "b", then T1+T2 is larger than T4. This is because all the interlayer spacing differences cannot be equal to or larger than "b" if T1+T2 is between T2 and T3 or between T3 and T4. From this, a≧3b has to be met on this design condition.

The minimum interlayer spacing difference "b" needs to be larger than the sum of the condition to be able to avoid the interference problem (e.g. 1 μm obtained in the simulation) and the thickness errors of the intermediate layers 15 to 18 and cannot be freely set. Accordingly, if comparison is made on the same condition, the entire thickness of the intermediate layers 15 to 18 can be more suppressed in this embodiment than in the design of the comparative example.

As described above, according to this embodiment, the five-layer disc capable of preventing reflected lights from the other layers from returning to the optical head substantially along the same optical path as reflected light from the readout layer and the recording/reproducing device using the same can be provided. Thus, a light quantity variation produced by the interference of the reflected lights from the other layers and the one from the readout layer on the light receiving element of the optical head can be reduced, therefore a good reproduction signal can be obtained. Further, since the spacing from the layer L0 to the layer L4 can be made relatively short, it is advantageous in terms of ensuring compatibility with existing discs.

Similar effects can be obtained also in the case where the thicknesses T1 to T4 of the respective intermediate layers 15 to 18 are expressed by an expression (9).

$$T1<T3<T2<T4 \quad (9)$$

Similar effects can be obtained also in the case where the thicknesses T1 to T4 of the respective intermediate layers 15 to 18 are expressed by an expression (10).

$$T3<T1<T4<T2 \quad (10)$$

Similar effects can be obtained also in the case where the thicknesses T1 to T4 of the respective intermediate layers 15 to 18 are expressed by an expression (11).

$$T4<T2<T3<T1 \quad (11)$$

Next, another design example of this embodiment is shown in FIG. 7. In the example shown in FIG. 7, the thickness T2 of the even-numbered layer (intermediate layer 16) is set to be larger than those T1, T3 of the odd-numbered layers (intermediate layers 15, 17) for the recording layers 15 to 17 excluding the intermediate layer 18 located foremost when seen from the light incident surface 3*a*, and the thickness of the intermediate layer 18 is the minimum interlayer spacing. In this case as well, all the interlayer spacings are not equal if a≧2b is satisfied. Therefore, similar effects can be obtained.

Second Embodiment

Figure 8:
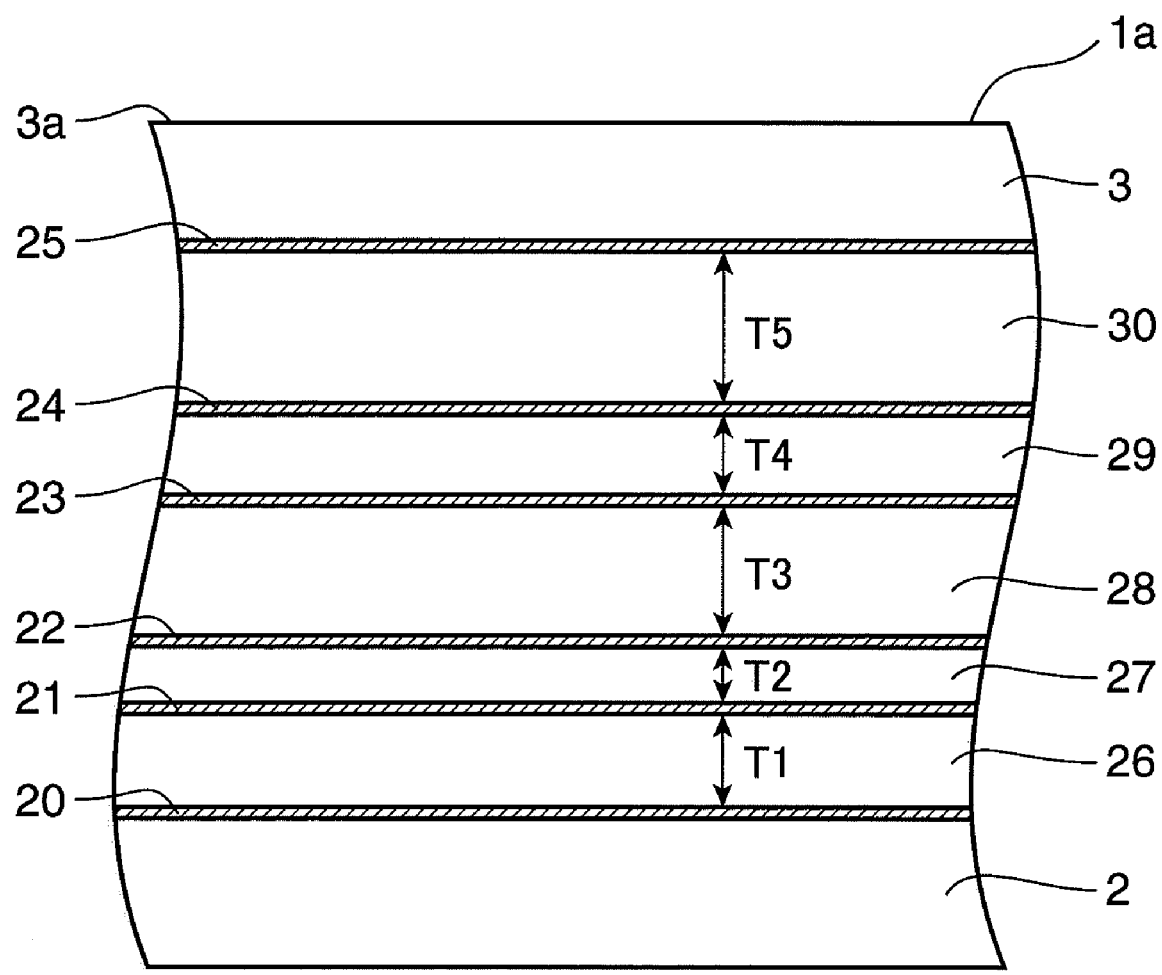
FIG. 8 is a partial section of an optical disc according to a second embodiment of the invention.

FIG. 8 is a partial section of an optical disc according to a second embodiment of the present invention, and FIG. 9 shows spacings between recording layers of the optical disc shown in FIG. 8. This embodiment differs from the first embodiment only in the structure of a disc cross section, and the same constituent elements as those in FIG. 3 are identified by the same reference numerals and not described. The construction of a recording/reproducing device used in this embodiment is the same as that of the first embodiment shown in FIG. 4 and not described in detail.

In FIG. 8, information recording layers for storing data are identified as reference elements 20-25. Hereinafter, the recording layer 20 is called a layer L0, the recording layer 21a layer L1, the recording layer 22 a layer L2, the recording layer 23 a layer L3, the recording layer 24 a layer L4 and the recording layer 25 a layer L5. Intermediate layers, which have a high light transmittance and function to physically and optically separate the respective recording layers, are identified as reference elements 26-30.

In the optical disc 1a according to this embodiment, if T1, T2, T3, T4 and T5 respectively denote the thicknesses of the intermediate layers 26, 27, 28, 29 and 30, the thicknesses of the respective intermediate layers are set to satisfy equations (12) to (16).

$$T1=a+2b \quad (12)$$

$$T2=a \quad (13)$$

$$T3=a+3b \quad (14)$$

$$T4=a+b \quad (15)$$

$$T5=a+4b \quad (16)$$

Here, "a" is a minimum interlayer spacing and "b" is a minimum interlayer spacing difference, both being set to satisfy $a \geq 3b$. The value of the minimum interlayer spacing difference "b" is set to be larger than thickness errors of the respective intermediate layers 26 to 30.

In the case of reproducing data from the optical disc 1a having the above structure, a laser beam emitted from an optical head is incident on a light incident surface 3a of the optical disc 1a and is focused on a desired recording layer out of the layers L0 to L5. The light reflected by this recording layer returns to the optical head to have a signal detected by a light receiving element. At this time, parts of lights reflected by the recording layers other than the recording layer, from which data is reproduced, also return to the optical head.

However, in the optical disc 1a according to this embodiment, lights reflected by the other layers do not return to the optical head along the same optical path as the reflected light from the readout layer regardless of on which recording layer out of the layers L0 to L5 a laser beam is focused. This is described below.

A condition to prevent reflected light from the readout layer and those from the other layers from returning to the optical head along the same optical path in the optical disc 1a is that all the interlayer spacings are not equal. At this time, all the interlayer spacings (15 interlayer spacings) in the optical disc 1a are as shown in FIG. 9, and the following inequality expressions hold if a magnitude relation is considered.

$$T2<T4<T1<T3<T5 \quad (17)$$

$$T1+T2<T2+T3<T3+T4<T4+T5 \quad (18)$$

$$T2+T3+T4<T1+T2+T3<T3+T4+T5 \quad (19)$$

$$T1+T2+T3+T4<T2+T3+T4+T5<T1+T2+T3+T4+T5 \quad (20)$$

Here, since $a \geq 3b$ in this embodiment, the following inequality expressions hold.

$$T5<T1+T2 \quad (21)$$

$$T4+T5<T2+T3+T4 \quad (22)$$

$$T3+T4+T5<T1+T2+T3+T4 \quad (23)$$

Accordingly, inequality expressions hold between all the interlayer spacings from the expressions (17) to (23). Here, since the value of the minimum interlayer spacing difference "b" is set to be larger than the thickness errors of the intermediate layers 26 to 30, these inequality expressions constantly hold.

As described above, since all the interlayer spacings are not equal in the optical disc of this embodiment, the return of lights reflected by the other layers to the optical head along the same optical path as reflected light from the readout layer during the reproduction can be avoided.

Next, a case where it is designed to make the intermediate layers 26 to 30 successively thicker from a supporting substrate 2 toward the cover layer 3 is thought as a comparative example. At this time, if the order of the thicknesses in the structure shown in FIG. 9 is replaced to suppress the thicknesses of the intermediate layers, the respective interlayer spacings are as shown in FIG. 10.

Here, if all the interlayer spacing differences are equal to or larger than "b", then T1+T2 is larger than T5. This is because a difference between T1+T2 and T2 or T3 or T4 or T5 cannot be equal to or larger than "b" if T1+T2 is equal to or smaller than T5. From this, $a \geq 4b$ has to be met on this design condition. Thus, if comparison is made on the same condition, the entire thickness of the intermediate layers 26 to 30 can be more suppressed in this embodiment than in the design of the comparative example.

As described above, according to this embodiment, the six-layer disc capable of preventing reflected lights from the other layers from returning to the optical head substantially along the same optical path as reflected light from the readout layer and the recording/reproducing device using the same can be provided. Thus, a light quantity variation produced by the interference of the reflected lights from the other layers and the one from the readout layer on the light receiving element of the optical head can be reduced, therefore a good reproduction signal can be obtained. Further, since the spacing from the layer L0 to the layer L5 can be made relatively short, it is advantageous in terms of ensuring compatibility with existing discs.

Similar effects can be obtained also in the case where the thicknesses T1 to T5 of the respective intermediate layers 26 to 30 are expressed by an expression (24).

$$T1<T3<T5<T2<T4 \quad (24)$$

Similar effects can be obtained also in the case where the thicknesses T1 to T5 of the respective intermediate layers 26 to 30 are expressed by an expression (25).

$$T5<T3<T1<T4<T2 \quad (25)$$

Similar effects can be obtained also in the case where the thicknesses T1 to T5 of the respective intermediate layers 26 to 30 are expressed by an expression (26).

$$T4<T2<T5<T3<T1 \quad (26)$$

Next, another design example of this embodiment is shown in FIG. 11. In the example shown in FIG. 11, the thicknesses T2, T4 of the even-numbered layers (intermediate layers 27, 29) are set to be smaller than those T1, T3 of the odd-numbered layers (intermediate layers 26, 28) for the intermediate layers 26 to 29 excluding the intermediate layer 30 located foremost when seen from the light incident surface 3a, and the thickness of the intermediate layer 30 is the minimum interlayer spacing. In this case as well, all the interlayer spacings are not equal if $a \geq 3b$ is satisfied. Therefore, similar effects can be obtained.

Third Embodiment

Figure 12:
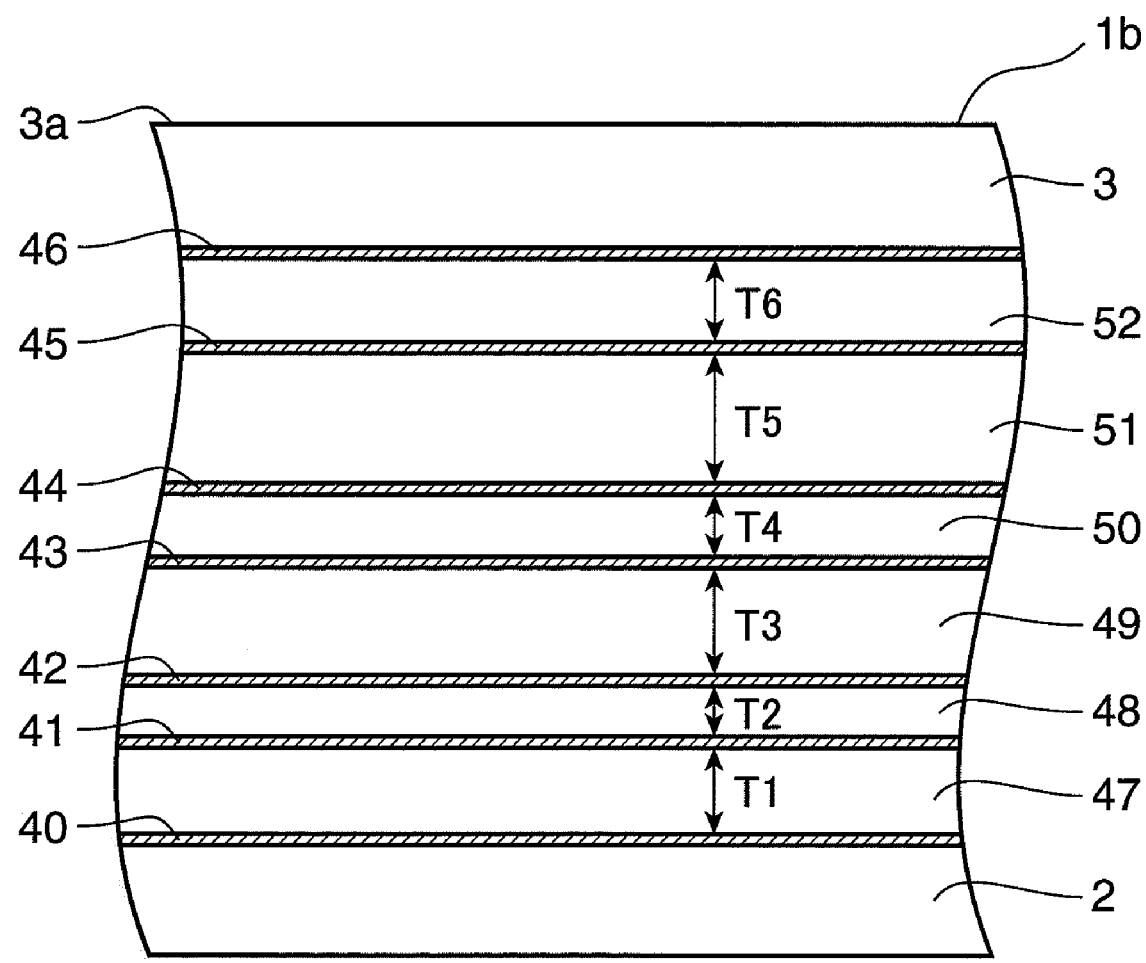
FIG. 12 is a partial section of an optical disc according to a third embodiment of the invention.

FIG. 12 is a partial section of an optical disc according to a third embodiment of the present invention, and FIG. 13 shows spacings between recording layers of the optical disc shown in FIG. 12. This embodiment differs from the first embodiment only in the structure of a disc cross section, and the same constituent elements as those in FIG. 3 are identified by the same reference numerals and not described. The construction of a recording/reproducing device used in this embodiment is the same as that of the first embodiment shown in FIG. 4 and not described in detail.

In FIG. 12, information recording layers for storing data are identified as reference elements 40-46. Hereinafter, the recording layer 40 is called a layer L0, the recording layer 41 a layer L1, the recording layer 42 a layer L2, the recording layer 43 a layer L3, the recording layer 44 a layer L4, the recording layer 45 a layer L5 and the recording layer 46 a layer L6. Intermediate layers, which have a high light transmittance and function to physically and optically separate the respective recording layers, are identified as reference elements 47-52.

In the optical disc 1b according to this embodiment, if T1, T2, T3, T4, T5 and T6 respectively denote the thicknesses of the intermediate layers 47, 48, 49, 50, 51 and 52, the thicknesses of the respective intermediate layers are set to satisfy equations (27) to (32).

$$T1 = a + 3b \tag{27}$$

$$T2 = a \tag{28}$$

$$T3 = a + 4b \tag{29}$$

$$T4 = a + b \tag{30}$$

$$T5 = a + 5b \tag{31}$$

$$T6 = a + 2b \tag{32}$$

Here, "a" is a minimum interlayer spacing and "b" is a minimum interlayer spacing difference, both being set to satisfy $a \geq 3b$. The value of the minimum interlayer spacing difference "b" is set to be larger than thickness errors of the respective intermediate layers 47 to 52.

In the case of reproducing data from the optical disc 1b having the above structure, a laser beam emitted from an optical head is incident on a light incident surface 3a of the optical disc 1b and is focused on a desired recording layer out of the layers L0 to L6. The light reflected by this recording layer returns to the optical head to have a signal detected by a light receiving element. At this time, parts of lights reflected by the recording layers other than the recording layer, from which data is reproduced, also return to the optical head.

However, in the optical disc 1b according to this embodiment, lights reflected by the other layers do not return to the optical head along the same optical path as the reflected light from the readout layer regardless of on which recording layer out of the layers L0 to L6 a laser beam is focused. This is described below.

A condition to prevent reflected light from the readout layer and those from the other layers from returning to the optical head along the same optical path in the optical disc 1b is that all the interlayer spacings are not equal. At this time, all the interlayer spacings (21 interlayer spacings) in the optical disc 1b are as shown in FIG. 13, and the following inequality expressions hold if a magnitude relation is considered.

$$T2 < T4 < T6 < T1 < T3 < T5 \tag{33}$$

$$T1 + T2 < T2 + T3 < T3 + T4 < T4 + T5 < T5 + T6 \tag{34}$$

$$T2 + T3 + T4 < T1 + T2 + T3 < T4 + T5 + T6 < T3 + T4 + T5 \tag{35}$$

$$T1 + T2 + T3 + T4 < T2 + T3 + T4 + T5 < T3 + T4 + T5 + T6 \tag{36}$$

$$T2 + T3 + T4 + T5 + T6 < T1 + T2 + T3 + T4 + T5 < T1 + T2 + T3 + T4 + T5 + T6 \tag{37}$$

Here, since $a \geq 3b$ in this embodiment, the following inequality expressions hold.

$$T5 < T1 + T2 \tag{38}$$

$$T5 + T6 < T2 + T3 + T4 \tag{39}$$

$$T3 + T4 + T5 < T1 + T2 + T3 + T4 \tag{40}$$

$$T3 + T4 + T5 + T6 < T2 + T3 + T4 + T5 + T6 \tag{41}$$

Accordingly, inequality expressions hold between all the interlayer spacings from the expressions (33) to (41). Here, since the value of the minimum interlayer spacing difference "b" is set to be larger than the thickness errors of the intermediate layers 47 to 52, these inequality expressions constantly hold.

As described above, since all the interlayer spacings are not equal in the optical disc of this embodiment, the return of lights reflected by the other layers to the optical head along the same optical path as reflected light from the readout layer during the reproduction can be avoided.

Next, a case where it is designed to make the intermediate layers 47 to 52 successively thicker from a supporting substrate 2 toward a cover layer 3 is thought as a comparative example. At this time, if the order of the thicknesses in the structure shown in FIG. 13 is replaced to suppress the thicknesses of the intermediate layers, the respective interlayer spacings are as shown in FIG. 14.

Here, if all the interlayer spacing differences are equal to or larger than "b", then T1+T2 is larger than T6. This is because a difference between T1+T2 and T2 or T3 or T4 or T5 or T6 cannot be equal to or larger than "b" if T1+T2 is equal to or smaller than T6. From this, $a \geq 5b$ has to be met on this design condition. Thus, if comparison is made on the same condition, the entire thickness of the intermediate layers 47 to 52 can be more suppressed in this embodiment than in the design of the comparative example.

As described above, according to this embodiment, the seven-layer disc capable of preventing reflected lights from the other layers from returning to the optical head substantially along the same optical path as reflected light from the readout layer and the recording/reproducing device using the same can be provided. Thus, a light quantity variation produced by the interference of the reflected lights from the other layers and the one from the readout layer on the light receiving element of the optical head can be reduced, therefore a good reproduction signal can be obtained. Further, since the spacing from the layer L0 to the layer L6 can be made relatively short, it is advantageous in terms of ensuring compatibility with existing discs.

Similar effects can be obtained also in the case where the thicknesses T1 to T6 of the respective intermediate layers 47 to 52 are expressed by an expression (42).

$$T1 < T3 < T5 < T2 < T4 < T6 \tag{42}$$

Similar effects can be obtained also in the case where the thicknesses T1 to T6 of the respective intermediate layers 47 to 52 are expressed by an expression (43).

$$T5<T3<T1<T6<T4<T2 \quad (43)$$

Similar effects can be obtained also in the case where the thicknesses T1 to T6 of the respective intermediate layers 47 to 52 are expressed by an expression (44).

$$T6<T4<T2<T5<T3<T1 \quad (44)$$

Next, another design example of this embodiment is shown in FIG. 15. In the example shown in FIG. 15, the thicknesses T2, T4 of the even-numbered layers (intermediate layers 48, 50) are set to be larger than those T1, T3, T5 of the odd-numbered layers (intermediate layers 47, 48, 51) for the intermediate layers 47 to 51 excluding the intermediate layer 52 located foremost when seen from the light incident surface 3a, and the thickness of the intermediate layer 52 is the minimum interlayer spacing. In this case as well, all the interlayer spacings are not equal if a≧3b is satisfied. Therefore, similar effects can be obtained.

Fourth Embodiment

Figure 16:
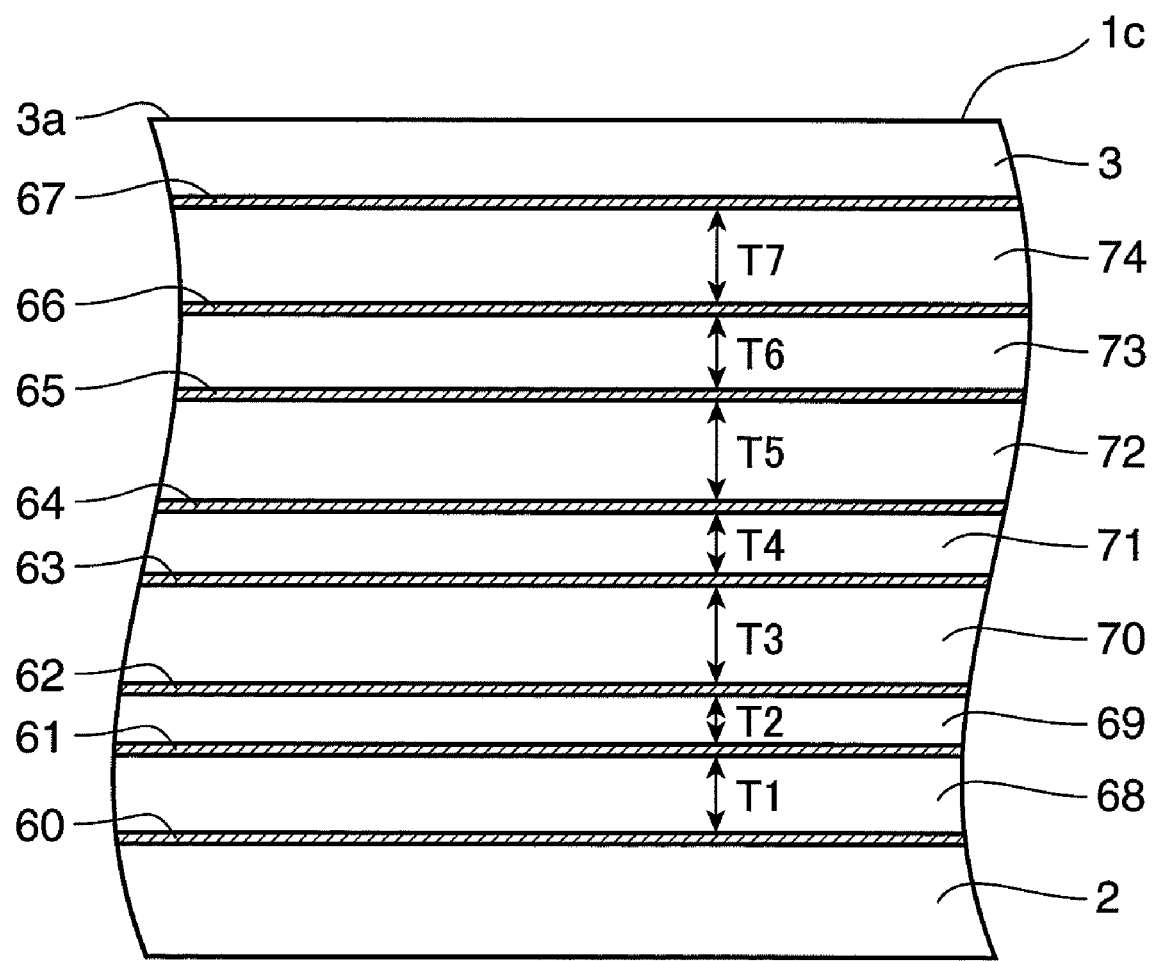
FIG. 16 is a partial section of an optical disc according to a fourth embodiment of the invention.

FIG. 16 is a partial section of an optical disc according to a fourth embodiment of the present invention, and FIG. 17 shows spacings between recording layers of the optical disc shown in FIG. 16. This embodiment differs from the first embodiment only in the structure of a disc cross section, and the same constituent elements as those in FIG. 3 are identified by the same reference numerals and not described. The construction of a recording/reproducing device used in this embodiment is the same as that of the first embodiment shown in FIG. 4 and not described in detail.

In FIG. 16, information recording layers for storing data are identified as reference elements 60-67. Hereinafter, the recording layer 60 is called a layer L0, the recording layer 61 a layer L1, the recording layer 62 a layer L2, the recording layer 63 a layer L3, the recording layer 64 a layer L4, the recording layer 65 a layer L5, the recording layer 66 a layer L6 and the recording layer 67 a layer L7. Further, intermediate layers, which have a high light transmittance and function to physically and optically separate the respective recording layers, are identified as reference elements 68-74.

In the optical disc 1c according to this embodiment, if T1, T2, T3, T4, T5, T6 and T7 respectively denote the thicknesses of the intermediate layers 68, 69, 70, 71, 72, 73 and 74, the thicknesses of the respective intermediate layers are set to satisfy equations (45) to (51).

$$T1=a+3b \quad (45)$$

$$T2=a \quad (46)$$

$$T3=a+4b \quad (47)$$

$$T4=a+b \quad (48)$$

$$T5=a+5b \quad (49)$$

$$T6=a+2b \quad (50)$$

$$T7=a+6b \quad (51)$$

Here, "a" is a minimum interlayer spacing and "b" is a minimum interlayer spacing difference, both being set to satisfy a≧4b. The value of the minimum interlayer spacing difference "b" is set to be larger than thickness errors of the respective intermediate layers 68 to 74.

In the case of reproducing data from the optical disc 1c having the above structure, a laser beam emitted from an optical head is incident on a light incident surface 3a of the optical disc 1c and is focused on a desired recording layer out of the layers L0 to L7. The light reflected by this recording layer returns to the optical head again to have a signal detected by a light receiving element. At this time, parts of lights reflected by the recording layers other than the recording layer, from which data is reproduced, also return to the optical head.

However, in the optical disc 1c according to this embodiment, lights reflected by the other layers do not return to the optical head along the same optical path as the reflected light from the readout layer regardless of on which recording layer out of the layers L0 to L7 a laser beam is focused. This is described below.

A condition to prevent reflected light from the readout layer and those from the other layers from returning to the optical head along the same optical path in the optical disc 1c is that all the interlayer spacings are not equal. At this time, all the interlayer spacings (28 interlayer spacings) in the optical disc 1c are as shown in FIG. 17, and the following inequality expressions hold if a magnitude relation is considered.

$$T2<T4<T6<T1<T3<T5<T7 \quad (52)$$

$$T1+T2<T2+T3<T3+T4<T4+T5<T5+T6<T6+T7 \quad (53)$$

$$T2+T3+T4<T1+T2+T3<T4+T5+T6<T3+T4+T5<T5+T6+T7 \quad (54)$$

$$T1+T2+T3+T4<T2+T3+T4+T5<T3+T4+T5+T6<T4+T5+T6+T7 \quad (55)$$

$$T2+T3+T4+T5+T6<T1+T2+T3+T4+T5<T3+T4+T5+T6+T7 \quad (56)$$

$$T1+T2+T3+T4+T5+T6<T2+T3+T4+T5+T6+T7<T1+T2+T3+T4+T5+T6+T7 \quad (57)$$

Here, since a≧4b in this embodiment, the following inequality expressions hold.

$$T7<T1+T2 \quad (58)$$

$$T6+T7<T2+T3+T4 \quad (59)$$

$$T4+T5+T6+T7<T2+T3+T4+T5+T6 \quad (60)$$

$$T3+T4+T5+T6+T7<T1+T2+T3+T4+T5+T6 \quad (61)$$

If a=5b, T1+T2+T3+T4=T5+T6+T7. Thus, in this embodiment, the following expression holds if a=4b.

$$T3+T4+T5<T1+T2+T3+T4<T5+T6+T7<T2+T3+T4+T5 \quad (62)$$

Accordingly, inequality expressions hold between all the interlayer spacings from the expressions (52) to (62). Here, since the value of the minimum interlayer spacing difference "b" is set to be larger than the thickness errors of the intermediate layers 68 to 74, these inequality expressions constantly hold.

As described above, since all the interlayer spacings are not equal in the optical disc of this embodiment, the return of lights reflected by the other layers to the optical head along the same optical path as reflected light from the readout layer during the reproduction can be avoided.

Next, a case where it is designed to make the intermediate layers 68 to 74 successively thicker from a supporting substrate 2 toward a cover layer 3 is thought as a comparative example. At this time, if the order of the thicknesses in the structure shown in FIG. 17 is replaced to suppress the intermediate layers, the respective interlayer spacings are as shown in FIG. 18.

Here, if all the interlayer spacing differences are equal to or larger than "b", then T1+T2 is larger than T7. This is because a difference between T1+T2 and T2 or T3 or T4 or T5 or T6 or T7 cannot be equal to or larger than "b" if T1+T2 is equal to or smaller than T7. From this, a≧6b has to be met on this design condition. Thus, if comparison is made on the same condition, the entire thickness of the intermediate layers 68 to 74 can be more suppressed in this embodiment than in the design of the comparative example.

As described above, according to this embodiment, the eight-layer disc capable of preventing reflected lights from the other layers from returning to the optical head substantially along the same optical path as reflected light from the readout layer and the recording/reproducing device using the same can be provided. Thus, a light quantity variation produced by the interference of the reflected lights from the other layers and the one from the readout layer on the light receiving element of the optical head can be reduced, therefore a good reproduction signal can be obtained. Further, since the spacing from the layer L0 to the layer L7 can be made relatively short, it is advantageous in terms of ensuring compatibility with existing discs.

Similar effects can be obtained also in the case where the thicknesses T1 to T7 of the respective intermediate layers 68 to 74 are expressed by an expression (63).

$$T1<T3<T5<T7<T2<T4<T6 \quad (63)$$

Similar effects can be obtained also in the case where the thicknesses T1 to T7 of the respective intermediate layers 68 to 74 are expressed by an expression (64).

$$T7<T5<T3<T1<T6<T4<T2 \quad (64)$$

Similar effects can be obtained also in the case where the thicknesses T1 to T7 of the respective intermediate layers 68 to 74 are expressed by an expression (65).

$$T6<T4<T2<T7<T5<T3<T1 \quad (65)$$

Next, another design example of this embodiment is shown in FIG. 19. In the example shown in FIG. 19, the thicknesses T2, T4, T6 of the even-numbered layers (intermediate layers 69, 71, 73) are set to be smaller than those T1, T3, T5 of the odd-numbered layers (intermediate layers 68, 70, 72) for the intermediate layer 68 to 73 excluding the intermediate layer 74 located foremost when seen from the light incident surface 3a, and the thickness of the intermediate layer 74 is the minimum interlayer spacing. In this case as well, all the interlayer spacings are not equal if a≧4b is satisfied. Therefore, similar effects can be obtained.

Fifth Embodiment

Figure 20:
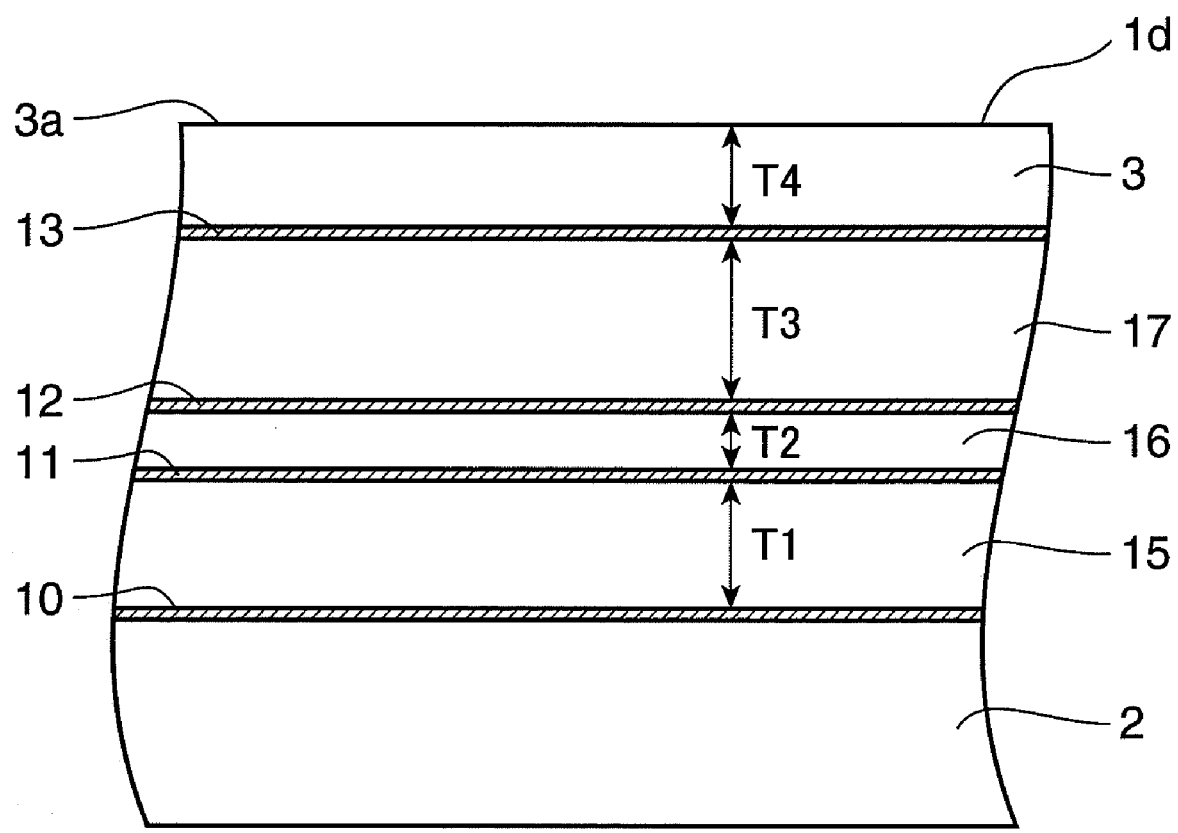
FIG. 20 is a partial section of an optical disc according to a fifth embodiment of the invention.
Figure 24:
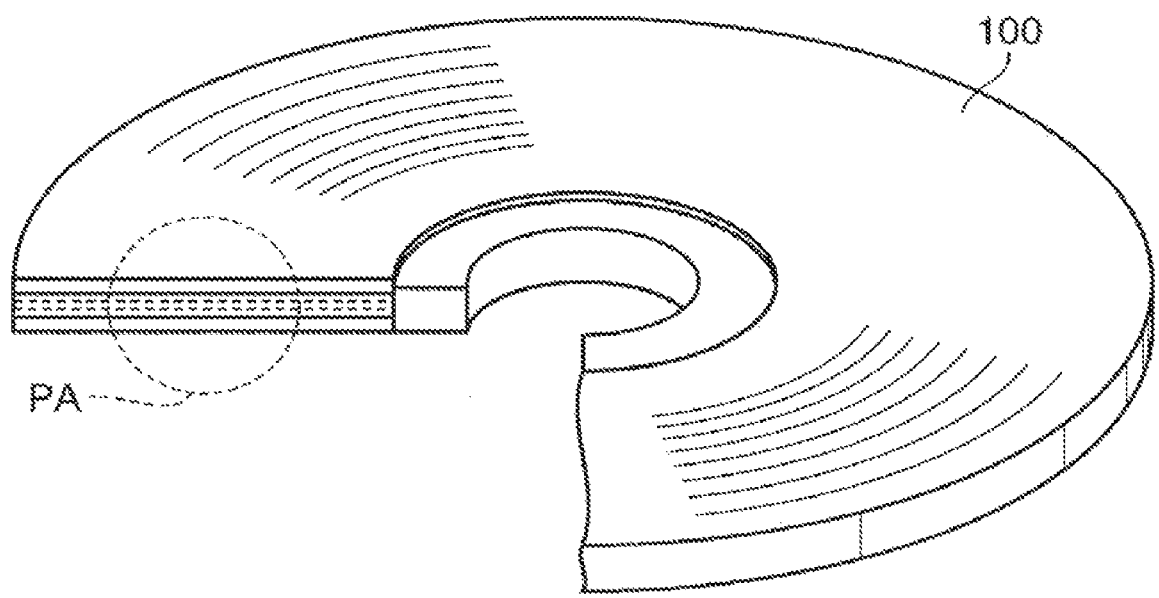
FIG. 24 is a perspective view partly cut away showing the external appearance of an optical disc.

FIG. 20 is a partial section of an optical disc according to a fifth embodiment of the present invention, and FIG. 21 shows spacings between recording layers and spacings between the recording layers and a light incident surface of a cover layer in the optical disc shown in FIG. 20. This embodiment differs from the first embodiment only in the structure of a disc cross section, and the same constituent elements as those in FIG. 3 are identified by the same reference numerals and not described. The construction of a recording/reproducing device used in this embodiment is the same as that of the first embodiment shown in FIG. 4 and not described in detail.

In FIG. 20, information recording layers for storing data are identified as reference elements 10-13. Hereinafter, the recording layer 10 is called a layer L0, the recording layer a layer L1, the recording layer 12 a layer L2 and the recording layer 13 a layer L3. Further, intermediate layers, which have a high light transmittance and function to physically and optically separate the respective recording layers, are identified as reference elements 15-17. Moreover, a cover layer, which has a high light transmittance, is identified as reference element 3, and a light incident surface of the cover layer 3 is identified as reference element 3a. Hereinafter, the light incident surface 3a is called an Sf-surface.

In the optical disc 1d according to this embodiment, if T1, T2, T3 and T4 respectively denote the thicknesses of the intermediate layers 15, 16 and 17 and the cover layer 3, then the thicknesses of the respective intermediate layers 15 to 17 and the cover layer 3 are set to satisfy equations (66) to (69).

$$T1=a+2b \quad (66)$$

$$T2=a \quad (67)$$

$$T3=a+3b \quad (68)$$

$$T4=a+b \quad (69)$$

Here, "a" is a minimum interlayer spacing and "b" is a minimum interlayer spacing difference, both being set to satisfy a≧2b. The value of the minimum interlayer spacing difference "b" is set to be larger than thickness errors of the respective intermediate layers 15 to 17 and the cover layer 3.

In the case of reproducing data from the optical disc 1d having the above structure, a laser beam emitted from an optical head is incident on the light incident surface 3a of the optical disc 1d and is focused on a desired recording layer out of the layers L0 to L3. The light reflected by this recording layer returns to the optical head again to have a signal detected by a light receiving element. At this time, parts of lights reflected by the recording layers other than the recording layer, from which data is reproduced, and a part of light reflected by the Sf-surface also return to the optical head.

Here, the influence of light reflected by the Sf-surface is described in detail. Normally, in order to reduce the influence of scratches and dust on the Sf-surface, the thickness of the cover layer is set such that light reflected by the Sf-surface during the reproduction from the respective recording layers is sufficiently defocused on the light receiving element. However, in consideration of compatibility with optical discs presently put to practical use, the thickness from the Sf-surface to the rearmost recording layer cannot be largely changed. Thus, the cover layer has to be made thinner as the number of recording layers increases.

For example, taking the first embodiment as an example, if the minimum interlayer spacing "a" is 10 μm and the minimum interlayer spacing difference "b" is 5 μm, then the thicknesses of the intermediate layers are 20 μm, 10 μm, 25 μm and 15 μm. If a BD (Blu-ray Disc) is assumed as an existing optical disc, then the thickness from an Sf-surface to the rearmost recording layer is 100 μm. At this time, the thickness of the cover layer is 30 μm. This thickness of the cover layer is not much different from those of the intermediate layers and reflection on the light incident surface needs to be considered similar to reflection on the recording layers other than the readout layer depending on the reflected light quantity.

Next, the reflected light quantity on the Sf-surface and that of signal lights are described. If the reflectance of signal lights returning from the respective recording layers and the light incident surface of the cover layer is assumed as a multilayer reflectance, then a multilayer reflectance LR0 of the layer L0 is, for example, expressed by the following equation when TS denotes a single film transmittance of the light incident surface of the cover layer, TL3 a single film transmittance of the layer L3, TL2 a single film transmittance of the layer L2, TL1 a single film transmittance of the layer L1 and RL0 a single film reflectance of the layer L0.

$$LR0=(TS \times TL3 \times TL2 \times TL1)^2 \times RL0 \quad (70)$$

Accordingly, in a three-layer disc as shown in FIG. 25, the multilayer reflectances of an light incident surface of a cover layer, layers L2, L1 and L0 are respectively 3.0%, 5.5%, 5.8% and 6.5% if the single film reflectance and single film transmittance of the light incident surface of the cover layer are 3.0% and 97.0%, the single film reflectance and single film transmittance of the layer L2 are 5.8% and 78.3%, the single film reflectance and single film transmittance of the layer L1 are 10.0% and 71.7% and the single film reflectance of the layer L0 is 22.0%.

In a four-layer disk as in this embodiment, the multilayer reflectances of a light incident surface of a cover layer and layers L3, L2, L1 and L0 are respectively 3.0%, 3.8%, 3.4%, 3.7% and 4.7% if the single film reflectance and single film transmittance of the light incident surface of the cover layer are 3.0% and 97.0%, the single film reflectance and single film transmittance of the layer L3 are 4.0% and 80.8%, the single film reflectance and the single film transmittance of the layer L2 are 5.6% and 78.5%, the single film reflectance and the single film transmittance of the layer L1 are 9.7% and 72.0% and the single film reflectance of the layer L0 is 24.0%.

In a five-layer disc as in the first embodiment, the multilayer reflectances of a light incident surface of a cover layer and layers L4, L3, L2, L1 and L0 are respectively 3.0%, 2.8%, 2.5%, 2.3%, 2.5% and 3.2% if the single film reflectance and single film transmittance of the light incident surface of the cover layer are 3.0% and 97.0%, the single film reflectance and single film transmittance of the layer L4 are 3.0 & and 81.8%, the single film reflectance and single film transmittance of the layer L3 are 4.0% and 80.8%, the single film reflectance and the single film transmittance of the layer L2 are 5.6% and 78.5%, the single film reflectance and the single film transmittance of the layer L1 are 9.7% and 72.0% and the single film reflectance of the layer L0 is 24.0%.

From above, signal lights from the respective recording layers are 5.5% or higher and about twice the reflected light from the light incident surface of the cover layer in the three-layer disc; signal lights from the respective recording layers are about 3.4% and about the same as the reflected light from the light incident surface of the cover layer in the four-layer disc; and signal lights from the respective recording layers are about 2.5% and less than the reflected light from the light incident surface of the cover layer in the five-layer disc.

In this way, as the number of the recording layers increases, the multilayer reflectances of the respective recording layers decrease. Therefore, light reflected by the Sf-surface also largely influences the signal lights including the influence of the thinner cover layer.

The interference problem the present invention seeks to solve results not from lights produced by one reflection as described above, but from lights produced by a multitude of reflections by the respective recording layers and the light incident surface of the cover layer. If the number of the recording layers increases, attention needs to be paid to reflection on the Sf-surface. This is because differences between the thickness of the cover layer and those of the intermediate layers become smaller as the number of the recording layers increases as described above and reflected light from the light incident surface of the cover layer is more likely to satisfy an interference condition with signal lights. Even if these multiple reflected lights (stray lights) are very little, they largely vary the quantity of signal lights upon interfering with the signal lights.

For example, if P1 and P2 denote the quantity of the signal lights and the quantity of the stray lights, then a variation amount d of the signal lights by interference is expressed by the following equation.

$$d=\pm 2\sqrt{(P1 \times P2)} \quad (71)$$

In the design examples of the recording layers of the above three-layer, four-layer and five-layer optical discs, the quantity of stray lights to that of the signal lights are at most about 0.2%. If P2 is set to be 0.002×P1 and substituted into the equation (71), the quantity P1 of the signal lights vary by as much as ±9% by the interference.

Accordingly, for example, in an optical disc having four or more recording layers, reflected light from a light incident surface of a cover layer needs to be prevented from returning to an optical head along the same optical path as reflected light from a readout layer.

To this end, in the optical disc 1d according to this embodiment, not only the thicknesses of the respective intermediate layers 15 to 17, but also that of the cover layer 3 are set such that lights reflected by the other layers and the Sf-surface do not return to the optical head along the same optical path as the reflected light from the readout layer regardless of on which recording layer out of the layers L0 to L3 a laser beam is focused. This is described below.

A condition to prevent reflected light from the readout layer and those from the other layers and the Sf-surface from returning to the optical head along the same optical path in the optical disc 1d is that all the interlayer spacings are not equal.

If all the interlayer spacings in the optical disc 1d are expressed using the thicknesses T1 to T4 of the intermediate layers 15 to 17 and the cover layer 3, then there are ten interlayer spacings, i.e. T1, T2, T3, T4, T1+T2, T2+T3, T3+T4, T1+T2+T3, T2+T3+T4, T1+T2+T3+T4. At this time, the respective interlayer spacings are as shown in FIG. 21 and the following inequality expressions hold if a magnitude relation is considered. In FIG. 21, a+b corresponding to L3 to Sf means an interlayer spacing between the layer L3 (recording layer 13) and the Sf-surface (light incident surface of the cover layer 3), i.e. the thickness T4 of the cover layer 3. This similarly holds for other cells.

$$T2<T4<T1<T3 \quad (72)$$

$$T1+T2<T2+T3<T3+T4 \quad (73)$$

$$T2+T3+T4<T1+T2+T3<T1+T2+T3+T4 \quad (74)$$

Here, since a≧2b in this embodiment, the following inequality expression holds between the thickness T3 of the thickest intermediate layer 17 and the minimum one T1+T2 of the sums of the thicknesses of two adjacent intermediate layers and a difference between T3 and T1+T2 is larger than the minimum interlayer spacing difference "b".

$$T3<T1+T2 \quad (75)$$

Accordingly, inequality expressions hold between all the interlayer spacings from the expressions (72) to (75). Here, since the value of the minimum interlayer spacing difference "b" is set to be larger than the thickness errors of the intermediate layers 15 to 17 and the cover layer 3, these inequality expressions constantly hold.

As described above, since all the interlayer spacings are not equal in the optical disc of this embodiment, the return of lights reflected by the other layers and the Sf-surface to the optical head along the same optical path as reflected light from the readout layer during the reproduction can be avoided.

Next, a case where it is designed to make the intermediate layers 15 to 17 and the cover layer 3 successively thicker from a supporting substrate 2 toward the cover layer 3 is thought as a comparative example. At this time, if the order of the thicknesses in the structure shown in FIG. 21 is replaced to suppress the thicknesses of the intermediate layers and the cover layer, then the respective interlayer spacings are as shown in FIG. 22.

Here, if all the interlayer spacing differences are equal to or larger than "b", then T1+T2 is larger than T4. This is because the interlayer spacing differences cannot be equal to or larger than "b" if T1+T2 is between T2 and T3 or between T3 and T4. From this, a≧3b has to be met on this design condition.

The minimum interlayer spacing difference "b" needs to be larger than the sum of the condition to be able to avoid the interference problem (e.g. 1 μm obtained in the simulation) and the thickness errors of the intermediate layers 15 to 17 and the cover layer 3 and cannot be freely set. Accordingly, if comparison is made on the same condition, then the entire thickness of the intermediate layers 15 to 17 and the cover layer 3 can be more suppressed in this embodiment than in the design of the comparative example.

As described above, according to this embodiment, the four-layer disc capable of preventing reflected lights from the other layers and the Sf-surface from returning to the optical head substantially along the same optical path as reflected light from the readout layer and the recording/reproducing device using the same can be provided. Thus, a light quantity variation produced by the interference of the reflected lights from the other layers and the Sf-surface and the one from the readout layer on the light receiving element of the optical head can be reduced, therefore a good reproduction signal can be obtained. Further, since the spacing from the layer L0 to the Sf-surface can be made relatively short, it is advantageous in terms of ensuring compatibility with existing discs.

Similar effects can be obtained also in the case where the thicknesses T1 to T4 of the respective intermediate layers 15 to 17 and the cover layer 3 are expressed by an expression (76).

$$T1<T3<T2<T4 \quad (76)$$

Similar effects can be obtained also in the case where the thicknesses T1 to T4 of the respective intermediate layers 15 to 17 and the cover layer 3 are expressed by an expression (77).

$$T3<T1<T4<T2 \quad (77)$$

Similar effects can be obtained also in the case where the thicknesses T1 to T4 of the respective intermediate layers 15 to 17 and the cover layer 3 are expressed by an expression (78).

$$T4<T2<T3<T1 \quad (78)$$

Next, another design example of this embodiment is shown in FIG. 23. In the example shown in FIG. 23, the thickness T2 of the even-numbered layer (intermediate layer 16) is set to be larger than those T1, T3 of the odd-numbered layers (intermediate layers 15, 17) for the recording layers 15 to 17 excluding the cover layer 3 located foremost when seen from the light incident surface 3a, and the thickness of the cover layer 3 is the minimum interlayer spacing. In this case as well, all the interlayer spacings are not equal if a≧2b is satisfied. Therefore, similar effects can be obtained.

Although the thicknesses of the intermediate layers and the cover layer of the four-layer disc are described in this embodiment, the interference problem including reflected light from the light incident surface 3a of the cover layer 3 can be solved in a five-layer disc by forming the cover layer 3 on a recording layer 24 while omitting the recording layer 25 and the intermediate layer 30 and setting the thickness of the intermediate layer 30 to that of the cover layer 3 to similarly set the thicknesses of the intermediate layers and the cover layer 3 in the second embodiment. Further, the interference problem including reflected light from the light incident surface 3a of the cover layer 3 can be solved in a six-layer disc by forming the cover layer 3 on a recording layer 45 while omitting the recording layer 46 and the intermediate layer 52 and setting the thickness of the intermediate layer 52 to that of the cover layer 3 to similarly set the thicknesses of the intermediate layers and the cover layer 3 in the third embodiment. Furthermore, the interference problem including reflected light from the light incident surface 3a of the cover layer 3 can be solved in a seven-layer disc by forming the cover layer 3 on a recording layer 66 while omitting the recording layer 67 and the intermediate layer 74 and setting the thickness of the intermediate layer 74 to that of the cover layer 3 to similarly set the thicknesses of the intermediate layers and the cover layer 3 in the fourth embodiment.

Although the above description is made up to the optical disc having eight recording layers and the one having the cover layer and the seven recording layers, the present invention is similarly applicable to optical discs having nine or more recording layers and those having a cover layer and eight or more recording layers and similar effects can be obtained.

The present invention is summarized as follows from the above embodiments. Specifically, an optical recording medium according to the present invention comprises a plurality of recording layers, wherein all the spacings between two recording layers in all the combinations selected from the plurality of recording layers are not equal with each other.

In this optical recording medium, the return of lights reflected by other layers to an optical head along the same optical path as reflected light from a readout layer during the reproduction can be avoided. Thus, the deterioration of a servo signal and a reproduction signal of a reproducing device due to a variation of interference fringes on a light emitting element can be prevented and a good reproduction signal can be obtained.

It is preferable that: the plurality of recording layers are five or more recording layers; the optical recording medium further comprises four or more intermediate layers arranged between the recording layers; a minimum thickness of the even-numbered layers of the four or more intermediate layers when seen from a light incident side is larger than a maximum thickness of the odd-numbered layers or a minimum thickness of the odd-numbered layers is larger than a maximum thickness of the even-numbered layers; and the odd-numbered intermediate layers and the even-numbered intermediate layers are arranged to successively become thicker or thinner from the light incident side.

It is also preferable that: the plurality of recording layers are five or more recording layers; the optical recording medium further comprises four or more intermediate layers arranged between the recording layers; out of three or more of the four or more intermediate layers excluding the foremost or rearmost intermediate layer when seen from a light incident side, a minimum thickness of the even-numbered intermediate layers when seen from the light incident side is larger than a maximum thickness of the odd-numbered intermediate layers or a minimum thickness of the odd-numbered intermediate layers is larger than a maximum thickness of the even-numbered intermediate layers; and the odd-numbered intermediate layers and the even-numbered intermediate layers are arranged to successively become thicker or thinner from the light incident side.

In the above cases, the return of lights reflected by other layers to an optical head along the same optical path as reflected light from a readout layer during the reproduction can be avoided. Thus, the deterioration of a servo signal and a reproduction signal of a reproducing device due to a variation of interference fringes on a light emitting element can be prevented and a good reproduction signal can be obtained. In addition, the intermediate layers can be prevented from becoming thicker than necessary. Therefore, compatibility with existing optical discs can be ensured even if the number of layers increases.

All the spacings between two recording layers having one recording layer arranged therebetween are preferably larger than a maximum thickness of the intermediate layers. In this case, since the thicknesses of the intermediate layers can be set to minimum necessary levels, compatibility with existing optical discs can be more reliably ensured even if the number of layers increases.

It is preferable to satisfy $a/b \geq M/2$ when M (M is an integer equal to or greater than 4) denotes the number of the intermediate layers, "a" a minimum thickness of the intermediate layers and "b" a minimum value of thickness differences of the intermediate layers. In this case, since the thicknesses of the respective intermediate layers can be set to minimum necessary levels, compatibility with existing optical discs can be more reliably ensured even if the number of layers increases.

The intermediate layers are preferably successively arranged with substantially constant thickness differences when being successively arranged in an increasing order of the thickness. In this case, since the thicknesses of the respective intermediate layers can be set to minimum necessary levels, compatibility with existing optical discs can be more reliably ensured even if the number of layers increases.

In all the combinations of two recording layers selected from the plurality of recording layers, a minimum value of interlayer spacing difference indicating a difference between one spacing between recording layers and another spacing between recording layer is preferably 1 μm or larger and, in the case of considering thickness errors and variations of the intermediate layers, is preferably set to 5 μm or larger.

In this case, the deterioration of a servo signal and a reproduction signal of a reproducing device due to a variation of interference fringes on a light emitting element can be reliably prevented, a good reproduction signal can be obtained and the thicknesses of the respective intermediate layers can be set to minimum necessary levels, therefore compatibility with existing optical discs can be more reliably ensured even if the number of layers increases.

It is preferable that the optical recording medium further comprises a cover layer arranged at the light incident side; and that spacings between a surface of the cover layer at the light incident side and the plurality of respective recording layers are not equal with the spacings between two recording layers.

In this case, the return of lights reflected by other recording layers and the cover layer to an optical head along the same optical path as reflected light from a readout layer during the reproduction can be avoided. Thus, even if the number of the recording layers increases to increase the influence of the reflected light from the cover layer, the deterioration of a servo signal and a reproduction signal of a reproducing device due to a variation of interference fringes on a light emitting element can be reliably prevented, a good reproduction signal can be obtained.

It is preferable that: the plurality of recording layers are four or more recording layers; the optical recording medium further comprises three or more intermediate layers arranged between the recording layers and a cover layer arranged at a light incident side; a minimum thickness of the even-numbered layers of the cover layer and three or more intermediate layers when seen from the light incident side is larger than a maximum thickness of the odd-numbered layers or a minimum thickness of the odd-numbered layers is larger than a maximum thickness of the even-numbered layers; and the odd-numbered layers and the even-numbered layers are arranged to successively become thicker or thinner from the light incident side.

It is preferable that: the plurality of recording layers are four or more recording layers; the optical recording medium further comprises three or more intermediate layers arranged between the recording layers; out of three or more layers of the cover layer and the three or more intermediate layers excluding the cover layer or the rearmost intermediate layer when seen from the light incident side, a minimum thickness of the even-numbered layers when seen from the light incident side is larger than a maximum thickness of the odd-numbered layers or a minimum thickness of the odd-numbered layers is larger than a maximum thickness of the even-numbered layer; and the odd-numbered layers and the even-numbered layers are arranged to successively become thicker or thinner from the light incident side.

In the above cases, the return of lights reflected by other recording layers and the cover layer to an optical head along the same optical path as reflected light from a readout layer during the reproduction can be avoided. Thus, even if the number of the recording layers increases to increase the influence of the reflected light from the cover layer, the deterioration of a servo signal and a reproduction signal of a reproducing device due to a variation of interference fringes on a light emitting element can be prevented and a good reproduction signal can be obtained. In addition, the intermediate layers and the cover layer can be prevented from becoming thicker than necessary. Therefore, compatibility with existing optical discs can be ensured even if the number of layers increases.

All the spacings between two recording layers having one recording layer arranged therebetween are preferably larger than a maximum thickness of the cover layer and the intermediate layers. In this case, since the thicknesses of the respective intermediate layers and the cover layer can be set to minimum necessary levels, compatibility with existing optical discs can be more reliably ensured even if the number of layers increases.

It is preferable to satisfy $a/b \geq M/2$ when M (M is an integer equal to or greater than 4) denotes the number of the intermediate layers, "a" a minimum thickness of the cover layer and the intermediate layers and "b" a minimum value of thickness differences of the cover layer and the intermediate layers. In this case, since the thicknesses of the respective intermediate layers and the cover layer can be set to minimum necessary levels, compatibility with existing optical discs can be more reliably ensured even if the number of layers increases.

The cover layer and the intermediate layers are preferably successively arranged with substantially constant thickness differences when being successively arranged in an increasing order of the thickness. In this case, since the thicknesses of the respective intermediate layers and the cover layer can be set to minimum necessary levels, compatibility with existing optical discs can be more reliably ensured even if the number of layers increases.

The minimum value of the thickness differences of the cover layer and the intermediate layers is preferably 1 μm or larger and, in the case of considering thickness errors and variations of the cover layer and the intermediate layers, is preferably set to 5 μm or larger.

In this case, the deterioration of a servo signal and a reproduction signal of a reproducing device due to a variation of interference fringes on a light emitting element can be reliably prevented, a good reproduction signal can be obtained and the thicknesses of the respective intermediate layers and the cover layer can be set to minimum necessary levels, therefore compatibility with existing optical discs can be more reliably ensured even if the number of layers increases.

A reproducing device according to the present invention is the one for reproducing information from an optical recording medium including: a plurality of recording layers, comprising a light source; an objective lens for focusing light from the light source on a desired recording layer of the optical recording medium; a light receiving element for receiving the light from the optical recording medium to detect a signal; and a controller for generating a tracking error signal and a focus error signal in accordance with the signal detected by the light receiving element and controlling the position of the objective lens, wherein the optical recording medium is any one of the above optical recording media and information is reproduced from at least one of the recording layers of the optical recording medium.

In this reproducing device, the return of lights reflected by other layers to an optical head along the same optical path as reflected light from a readout layer during the reproduction can be avoided. Thus, the deterioration of a servo signal and a reproduction signal due to a variation of interference fringes on the light emitting element can be prevented and a good reproduction signal can be obtained.

It is preferable to further comprise a spherical aberration correcting member for correcting spherical aberrations on the respective recording layers of the optical recording medium. In this case, good servo signal and reproduction signal can be obtained since the spherical aberrations produced due to differences in the thicknesses of the respective recording layers can be corrected.

INDUSTRIAL APPLICABILITY

A multilayer optical disc according to the present invention can reduce the influence of interference on a servo signal and a reproduction signal in an optical head by preventing lights reflected by other layers from returning to the optical head along the same optical path as reflected light from a readout layer during the reproduction from an arbitrary layer. Thus, a high-capacity optical disc, from which reproduction signals with good quality can be obtained, can be provided. Simultaneously, intermediate layers can be prevented from becoming thicker than necessary, therefore compatibility with existing discs can be easily ensured.

What is claimed is:

1. An optical recording medium, comprising a plurality of laminated recording layers, wherein
a spacing is provided between each respective recording layer of the plurality of recording layers and each other recording layer of the plurality of recording layers, as a spacing between each respective pair of recording layers, the spacing between each respective pair of recording layers of all recording layer pair combinations selected from the plurality of recording layers is different from the spacing between each other recording layer pair combination of all recording layer combinations selected from the plurality of recording layers, the plurality of recording layers includes five or more recording layers, the optical recording medium further comprises four or more intermediate layers arranged between recording layers of the plurality of recording layers, three or more of the four or more intermediate layers, excluding a foremost intermediate layer or a rearmost intermediate layer, are composed of a plurality of alternating odd-numbered intermediate layers and one or more alternating even-numbered intermediate layers, out of the three or more of the four or more intermediate layers, excluding the foremost intermediate layer or the rearmost intermediate layer from a perspective of light incident side, a minimum thickness of the even-numbered intermediate layers from the perspective of the light incident side is larger than a maximum thickness of the odd-numbered intermediate layers or a minimum thickness of the odd-numbered intermediate layers is larger than a maximum thickness of the even-numbered intermediate layers, and the odd-numbered intermediate layers and the even-numbered intermediate layers are arranged to successively become thicker or thinner from the light incident side.

2. An optical recording medium according to claim 1, wherein:

a minimum thickness of the even-numbered intermediate layers of all the intermediate layers from the perspective of the light incident side is larger than a maximum thickness of the odd-numbered intermediate layers or a minimum thickness of the odd-numbered intermediate layers is larger than a maximum thickness of the even-numbered intermediate layers; and the odd-numbered intermediate layers and the even-numbered intermediate layers are arranged to successively become thicker or thinner from the light incident side.

3. An optical recording medium according to claim 1, wherein all spacings between a pair of two recording layers, of the plurality of recording layers, having another recording layer arranged therebetween are larger than a maximum thickness of the intermediate layers.

4. An optical recording medium according to claim 1, wherein $a/b \geq M/2$ is satisfied, when M, which is an integer equal to or greater than 4, denotes a number of the intermediate layers, "a" denotes a minimum thickness of the intermediate layers and "b" denotes a minimum value of thickness differences of the intermediate layers.

5. An optical recording medium according to claim 1, wherein the intermediate layers are successively arranged with substantially constant thickness differences when successively arranged in an increasing order of thickness.

6. An optical recording medium according to claim 1, wherein, in all combinations of two recording layers, selected from the plurality of recording layers, a minimum value of an interlayer spacing difference indicating a difference between one spacing between recording layers and another spacing between recording layers is 1 μm or larger.

7. An optical recording medium, comprising a plurality of laminated recording layers, wherein
a spacing is provided between each respective recording layer of the plurality of recording layers and each other recording layer of the plurality of recording layers, as a spacing between each respective pair of recording layers, the spacing between each respective pair of recording layers of all recording layer pair combinations selected from the plurality of recording layers is different from the spacing between each other recording layer pair combination of all recording layer combinations selected from the plurality of recording layers, the optical recording medium further comprises a cover layer arranged at a light incident side of the optical recording medium, a spacing is provided between a surface of the cover layer at the light incident side and each respective other recording layer of the plurality of recording layers, as a cover spacing between each respective other recording layer, the cover spacing between each respective other recording layer is different from the spacing between each respective pair of recording layers, the plurality of recording layers includes four or more recording layers, the optical recording medium further comprises three or more intermediate layers arranged between recording layers of the plurality of recording layers, three or more of the cover layer and the intermediate layers, excluding the cover layer or a rearmost intermediate layer from a perspective of the light incident side, are composed of a plurality of alternating odd-numbered layers and one or more alternating even-numbered layers, out of the three or more of the cover layer and the intermediate layers, excluding the cover layer or the rearmost intermediate layer from the perspective of the light incident side, a minimum thickness of the even-numbered layers from the perspective of the light incident side is larger than a maximum thickness of the odd-numbered layers or a minimum thickness of the odd-numbered layers is larger than a maximum thickness of the even-numbered layers, and the odd-numbered layers and the even-numbered layers are arranged to successively become thicker or thinner from the light incident side.

8. An optical recording medium according to claim 7, wherein a minimum thickness of the even-numbered layers of all the layers including the cover layer and the intermediate layers from the perspective of the light incident side is larger than a maximum thickness of the odd-numbered layers or a minimum thickness of the odd-numbered layers is larger than a maximum thickness of the even-numbered layers, and wherein the odd-numbered layers and the even-numbered layers are arranged to successively become thicker or thinner from the light incident side.

9. An optical recording medium according to claim 7, wherein all spacings between a pair of two recording layers, of the plurality of recording layers, having another recording layer arranged therebetween are larger than a maximum thickness of the cover layer and the intermediate layers.

10. An optical recording medium according to claim 7, wherein $a/b \geq M/2$ is satisfied, when M, which is an integer equal to or greater than 4, denotes a number of the intermediate layers, "a" denotes a minimum thickness of the cover layer and the intermediate layers and "b" denotes a minimum value of thickness differences of the cover layer and the intermediate layers.

11. An optical recording medium according to claim 7, wherein the cover layer and the intermediate layers are successively arranged with substantially constant thickness differences when successively arranged in an increasing order of thickness.

12. An optical recording medium according to claim 7, wherein a minimum value of thickness differences between the cover layer and the intermediate layers is 1 μm or larger.

13. A reproducing device for reproducing information from an optical recording medium including a plurality of recording layers, the reproducing device comprising:

a light source;

an objective lens for focusing light from the light source on a desired recording layer of the optical recording medium;

a light receiving element for receiving the light from the optical recording medium to detect a signal; and a controller for generating a tracking error signal and a focus error signal in accordance with the signal detected by the light receiving element and for controlling a position of the objective lens, wherein the optical recording medium is an optical recording medium according to claim 1, and the information is reproduced from at least one of the recording layers of the plurality of recording layers of the optical recording medium.

14. A reproducing device according to claim 13, further comprising a spherical aberration correcting member for correcting spherical aberrations on the respective recording layers of the plurality of recording layers of the optical recording medium.

* * * * *